United States Patent
Han et al.

(10) Patent No.: US 10,467,949 B2
(45) Date of Patent: Nov. 5, 2019

(54) DISPLAY APPARATUS, DRIVING METHOD THEREOF, AND COMPUTER READABLE RECORDING MEDIUM

(71) Applicant: SAMSUNG ELECTRONICS CO., LTD., Suwon-si, Gyeonggi-do (KR)

(72) Inventors: Ji-youn Han, Seoul (KR); Sung-hyun Jang, Seoul (KR); Sang-min Hyun, Seoul (KR); Se-ran Jeon, Seongnam-si (KR); Ji-min Hong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/460,469

(22) Filed: Mar. 16, 2017

(65) Prior Publication Data
US 2018/0012537 A1    Jan. 11, 2018

(30) Foreign Application Priority Data
Jul. 5, 2016    (KR) ........................ 10-2016-0085012

(51) Int. Cl.
*G09G 3/20* (2006.01)
*G06F 3/16* (2006.01)
*G09G 5/373* (2006.01)
*H04N 5/45* (2011.01)
*H04N 7/18* (2006.01)
*H04N 21/431* (2011.01)
*G06F 3/01* (2006.01)
(Continued)

(52) U.S. Cl.
CPC ........... *G09G 3/2096* (2013.01); *G06F 3/011* (2013.01); *G06F 3/048* (2013.01); *G06F 3/167* (2013.01); *G09G 5/14* (2013.01); *G09G 5/373* (2013.01); *H04N 5/45* (2013.01); *H04N 7/183* (2013.01); *H04N 21/4316* (2013.01); *H04N 21/44218* (2013.01); *H04N 21/44227* (2013.01); *G06F 3/017* (2013.01); *G06F 3/041* (2013.01); *G06F 3/14* (2013.01); *G09G 3/36* (2013.01); *G09G 3/3648* (2013.01); *G09G 5/12* (2013.01); *G09G 5/38* (2013.01); *G09G 2320/0261* (2013.01); *G09G 2354/00* (2013.01)

(58) Field of Classification Search
CPC ...................... G02B 5/0808; G06T 2219/2016
See application file for complete search history.

(56) References Cited

U.S. PATENT DOCUMENTS 8,933,892 B2    1/2015 Woolley et al.
2007/0124694 A1    5/2007 Van De Sluis et al.
(Continued)

FOREIGN PATENT DOCUMENTS

CN    105183151    12/2015
JP    4306355    7/2009
(Continued)

*Primary Examiner* — Jeffrey J Chow
(74) *Attorney, Agent, or Firm* — Nixon & Vanderhye P.C.

(57) ABSTRACT

A display apparatus, a driving method of a display apparatus, and a computer readable recording are provided. The method includes displaying an image on an entire screen area of a display unit, and in response to a user or a user device approaching (e.g., being detected by) the display unit, controlling the display unit to reduce the image and display the reduced image in a first area of the screen area and to control a second area of the screen area other than the first area to operate as a mirror.

19 Claims, 34 Drawing Sheets

(51) Int. Cl.
*G06F 3/048* (2013.01)
*H04N 21/442* (2011.01)
*G09G 5/14* (2006.01)
*G06F 3/041* (2006.01)
*G06F 3/14* (2006.01)
*G09G 3/36* (2006.01)
*G09G 5/38* (2006.01)
*G09G 5/12* (2006.01)

(56) References Cited

U.S. PATENT DOCUMENTS

| | | | | |
|---|---|---|---|---|
| 2007/0279591 | A1* | 12/2007 | Wezowski | G06F 3/013 |
| | | | | 351/208 |
| 2013/0229482 | A1* | 9/2013 | Vilcovsky | H04N 7/144 |
| | | | | 348/14.07 |
| 2014/0085178 | A1* | 3/2014 | Kokkosoulis | G09G 3/3611 |
| | | | | 345/156 |
| 2014/0146093 | A1* | 5/2014 | Sako | G09G 3/3406 |
| | | | | 345/690 |
| 2014/0223490 | A1 | 8/2014 | Pan et al. | |
| 2014/0226000 | A1* | 8/2014 | Vilcovsky | G06F 3/017 |
| | | | | 348/77 |
| 2015/0168724 | A1* | 6/2015 | Iwatsu | G09G 5/377 |
| | | | | 345/629 |
| 2016/0277439 | A1* | 9/2016 | Rotter | H04L 63/0861 |
| 2017/0053158 | A1* | 2/2017 | Kim | G06K 9/00335 |
| 2017/0178408 | A1* | 6/2017 | Bavor, Jr. | G06F 3/013 |
| 2017/0193969 | A1* | 7/2017 | Kimura | B60R 1/04 |
| 2018/0004684 | A1* | 1/2018 | Ihara | G06F 3/14 |
| 2018/0047226 | A1* | 2/2018 | Zhao | G07C 9/00071 |
| 2018/0059774 | A1* | 3/2018 | Lee | G06F 3/011 |

FOREIGN PATENT DOCUMENTS

| | | |
|---|---|---|
| KR | 10-2006-0091310 | 8/2006 |
| KR | 10-2014-0063275 | 5/2014 |

\* cited by examiner 243-2

240'

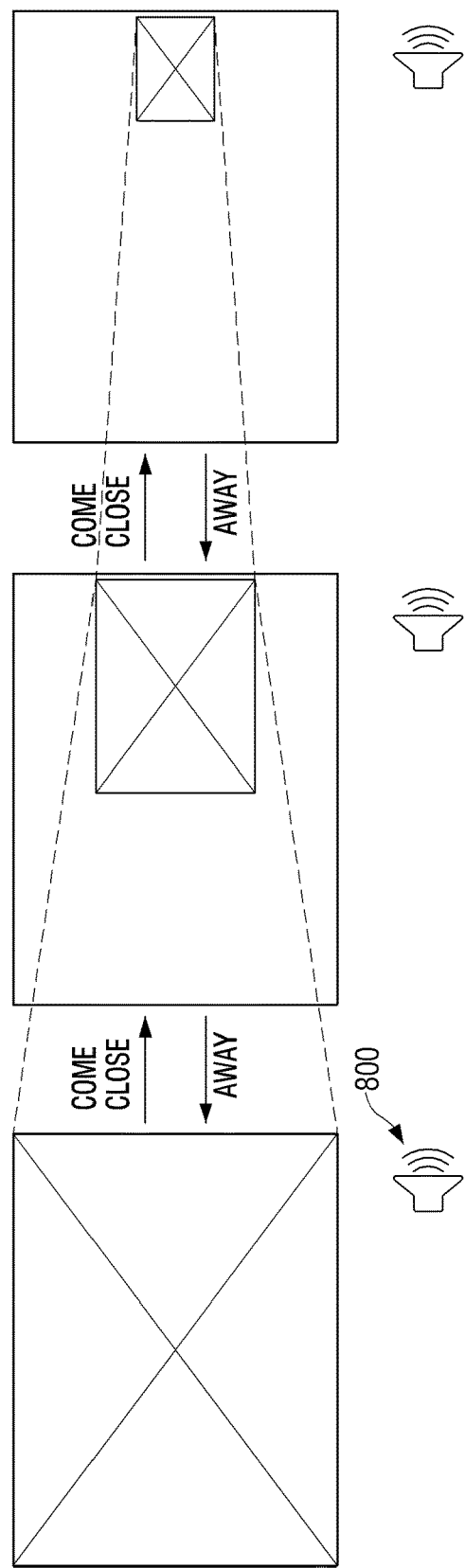

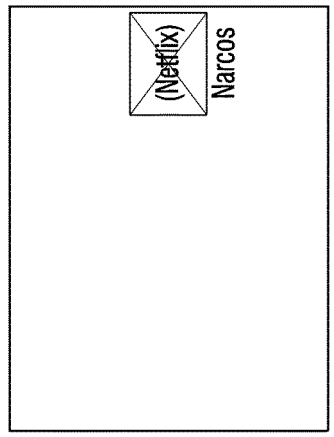
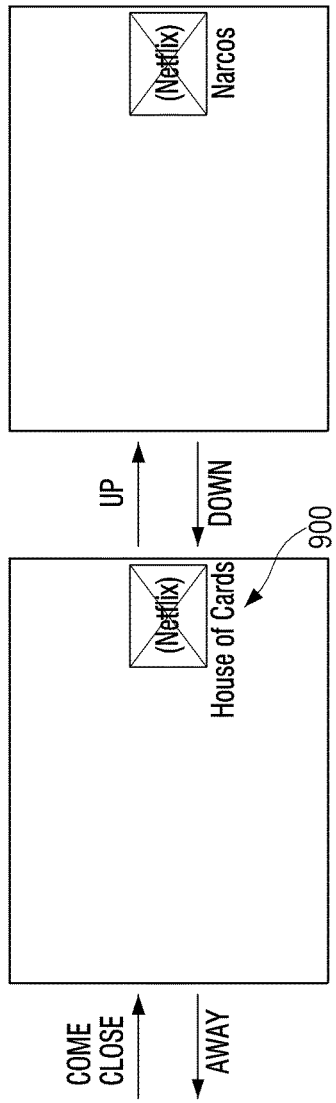
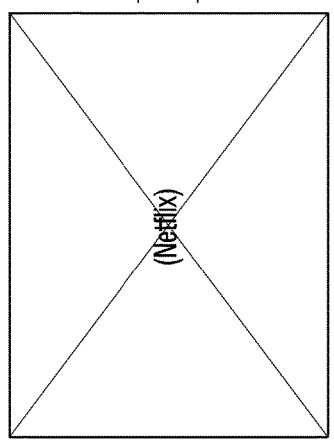
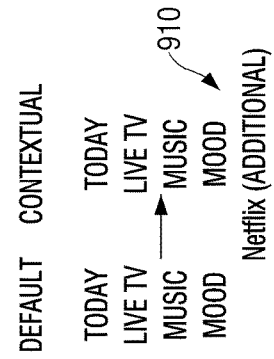
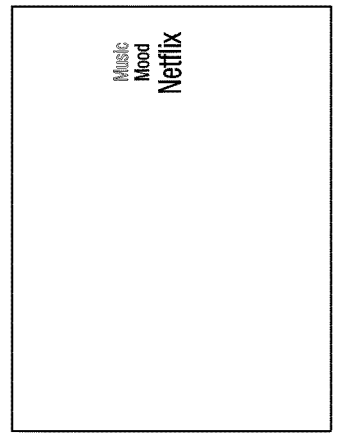

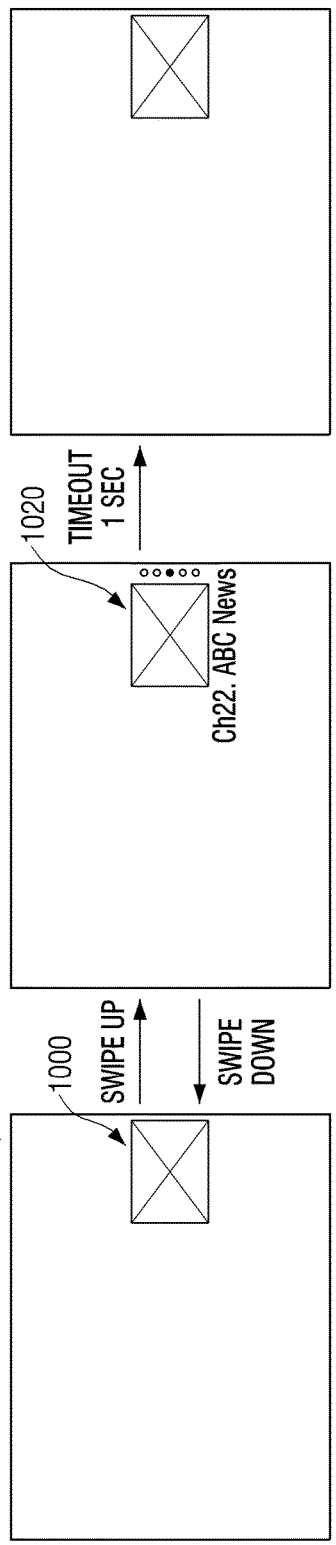
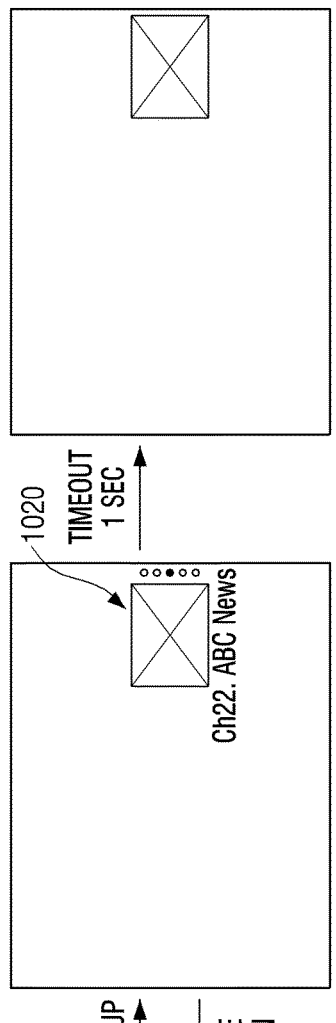
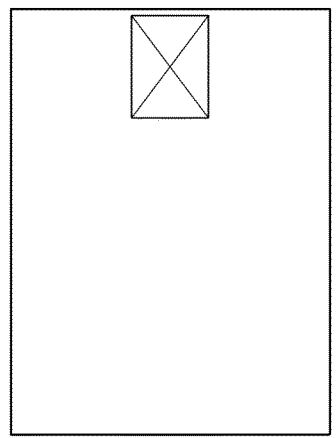
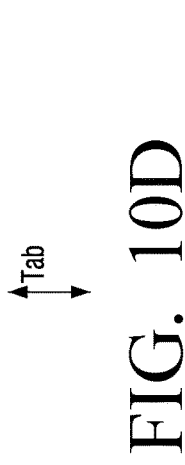
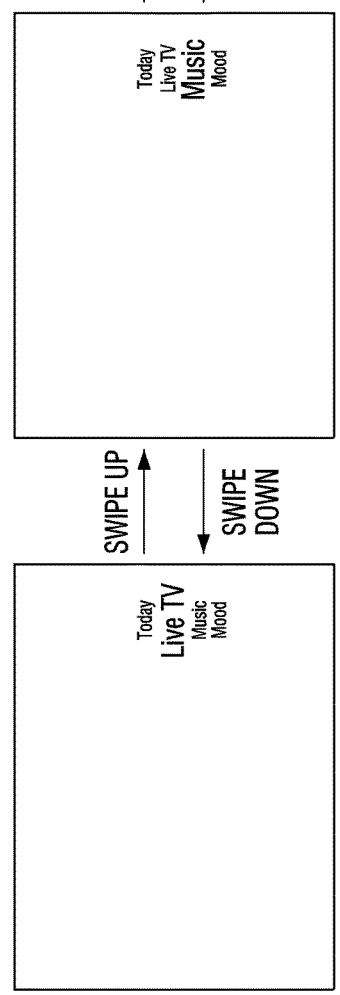
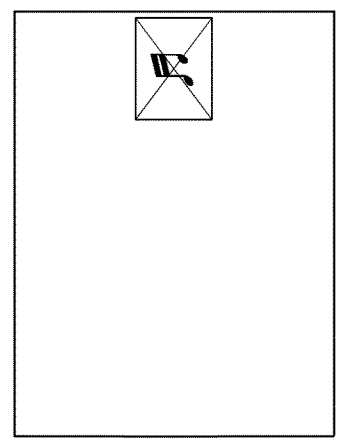
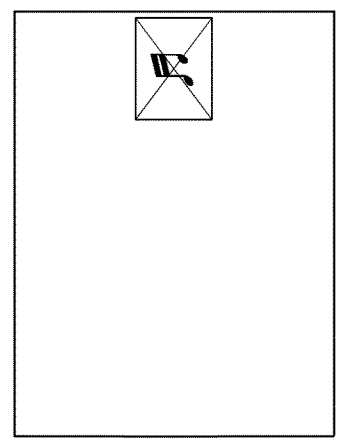

[HOVER] →
← AWAY

Ch21. BBC News

TIMEOUT
1 SEC

[HOVER] →
← AWAY

TIMEOUT
1 SEC
↓

[HOVER]

AWAY

Live TV

1300

AIR GESTURE LEFT

Overexposed
Maroon 5

TIMEOUT 3 SEC

Music

1310

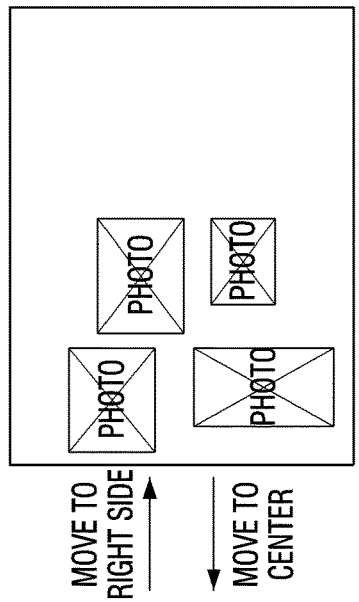
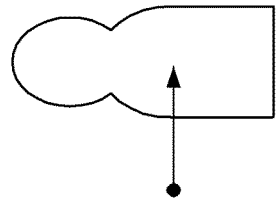
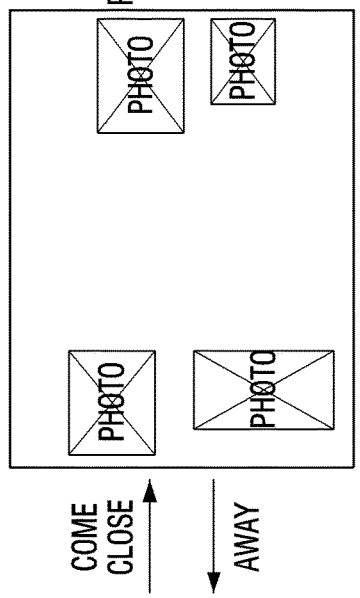
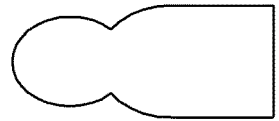
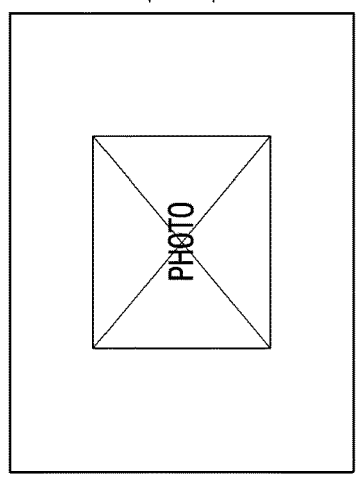
FIG. 14A  FIG. 14B  FIG. 14C

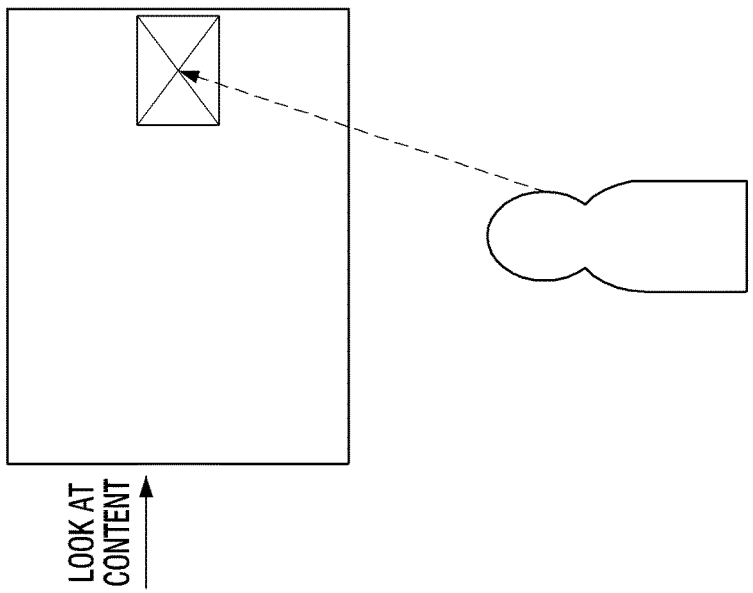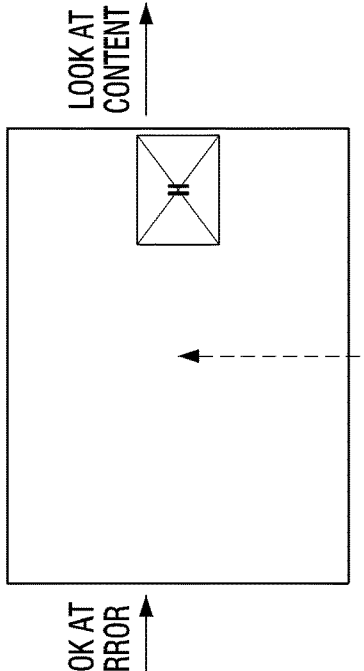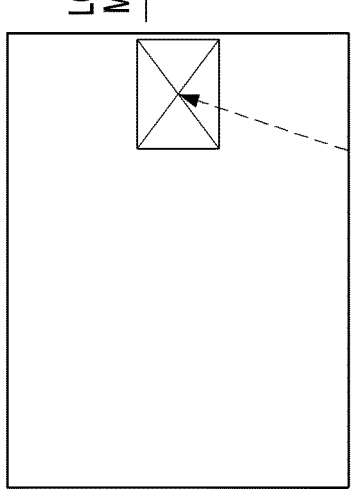

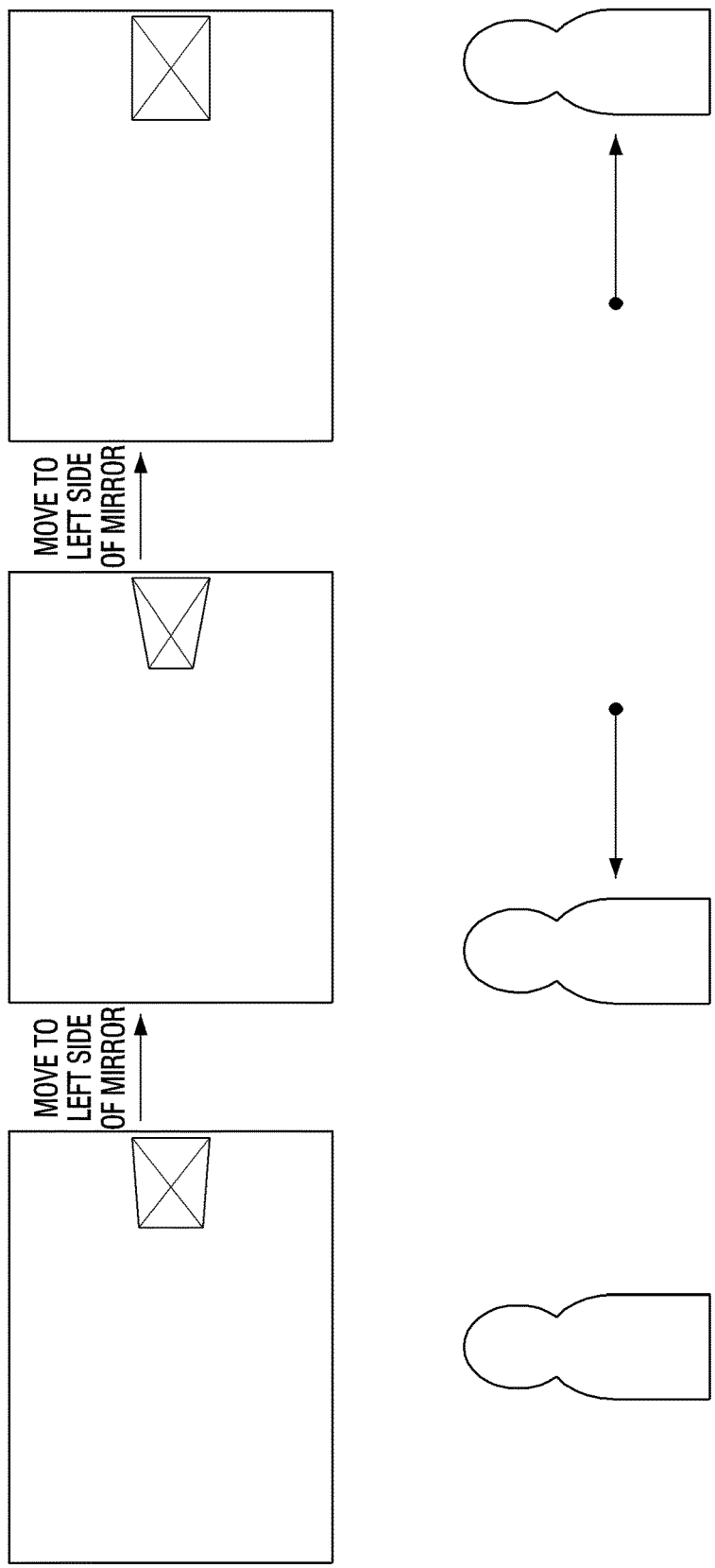

FIG. 16B
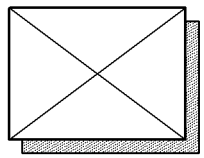 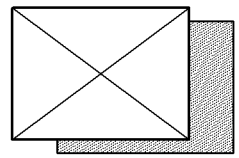 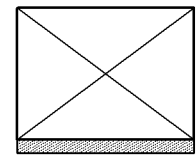

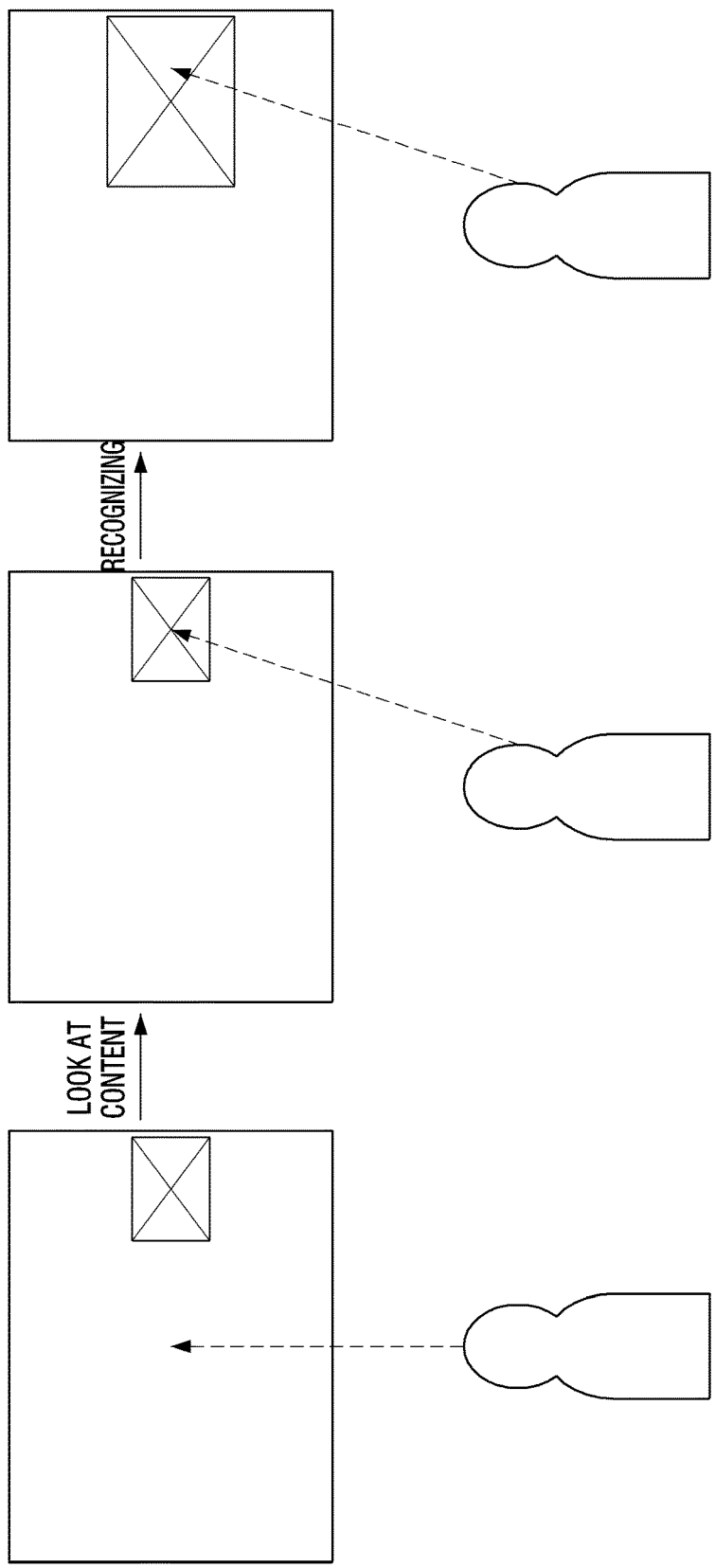

FIG. 18C 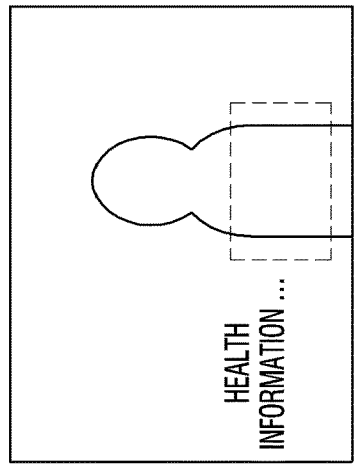 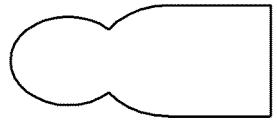
FIG. 18B 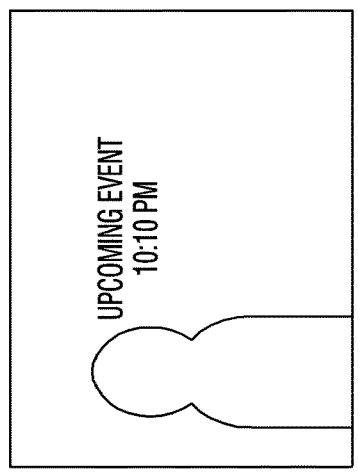 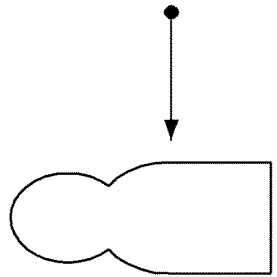
FIG. 18A 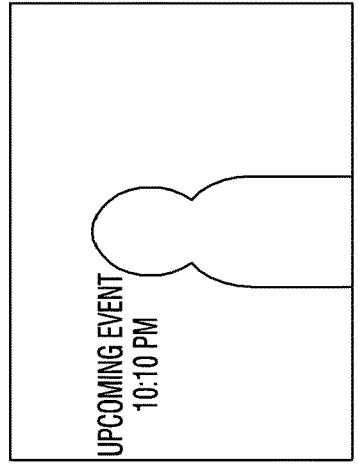 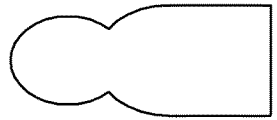

FIG. 19B
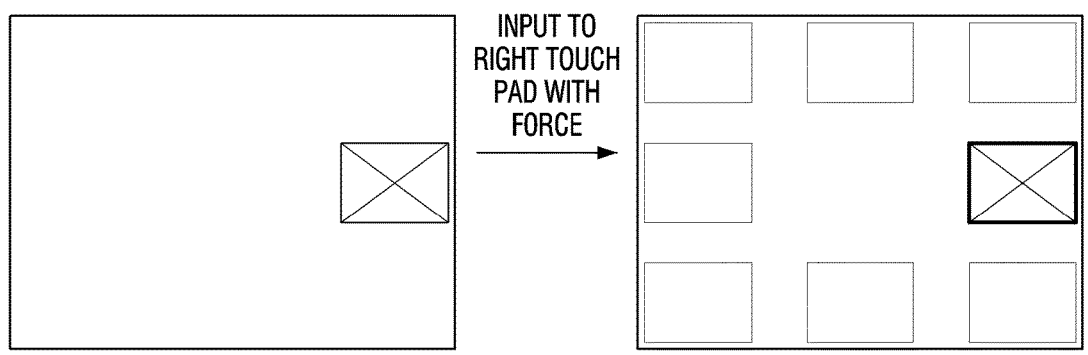
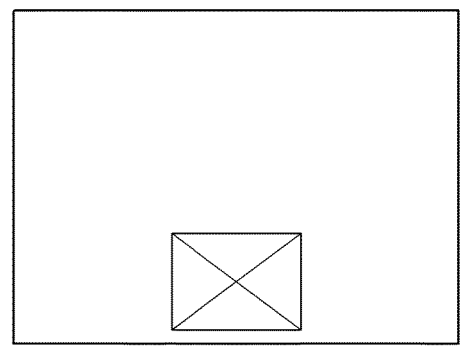

FIG. 20
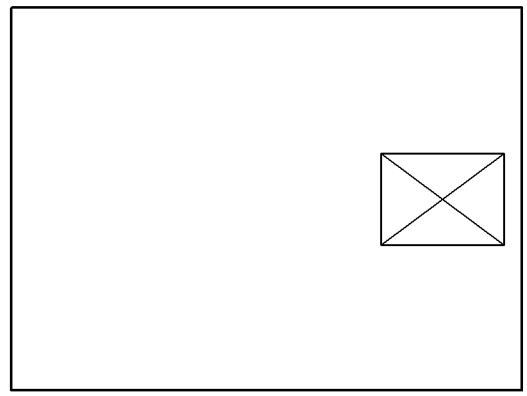
↓ BRING HAND TO RIGHT SIDE
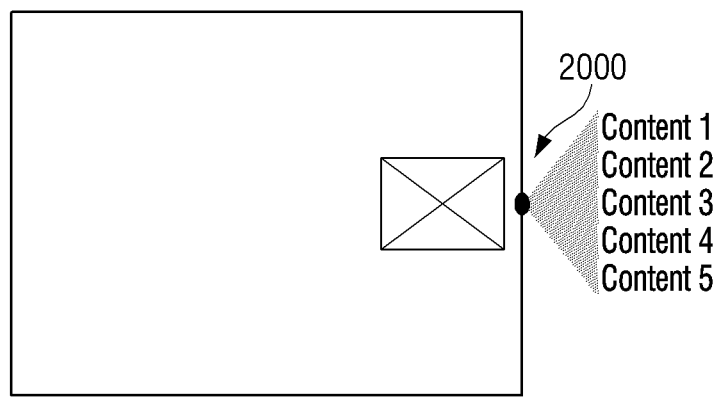

2100

MOBILE IS DETECTED.
PLEASE SELECT SERVICE TO
BE LINKED TO MOBILE.

Facebook
Google
Youtube
Spotify
Contact

Facebook IS LINKED.

Facebook VIDEO FEED

FIG. 22A
FIG. 22B
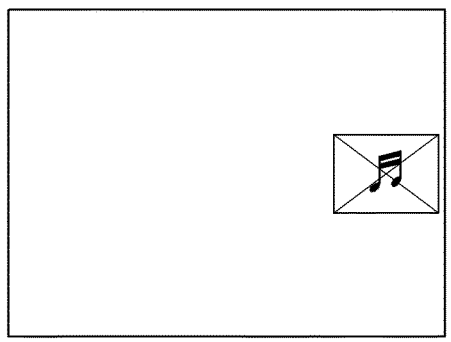
TAB →
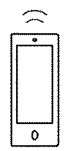
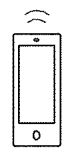
TAB MOVE TO
Facebook AND TAP
↓
FIG. 22C
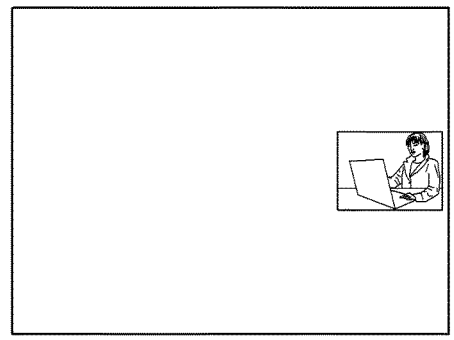

FIG. 23A
FIG. 23B
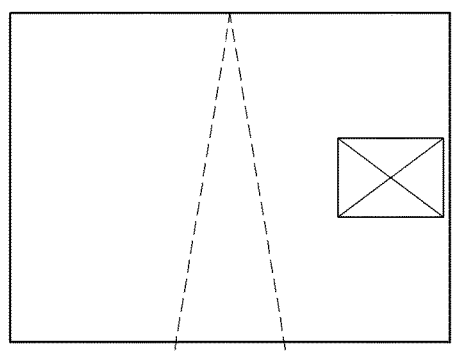
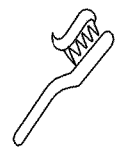
RECOGNIZE OBJECT WITH CAMERA →
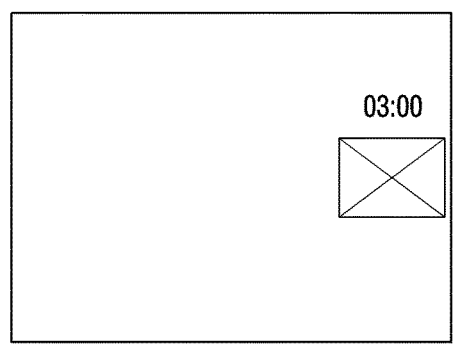

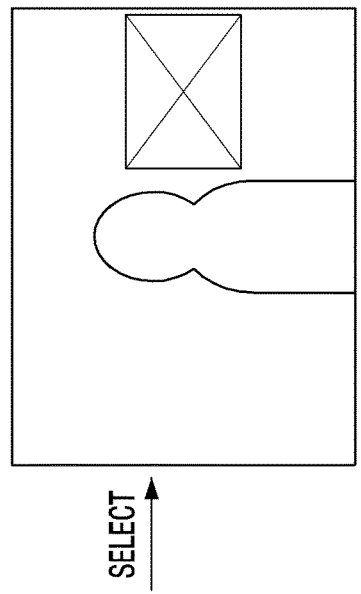
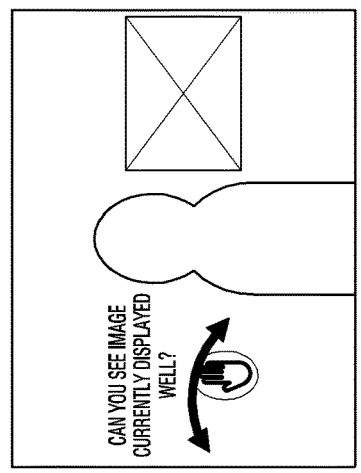
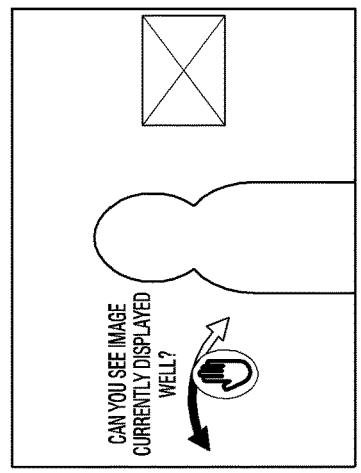

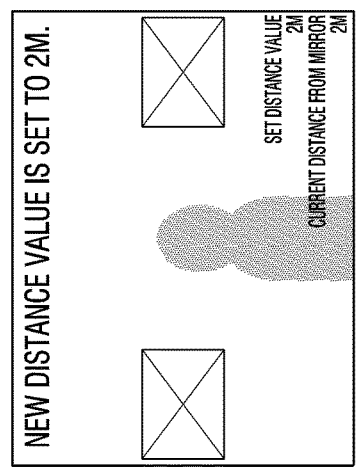
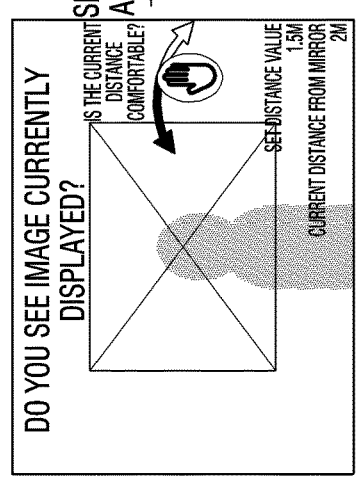
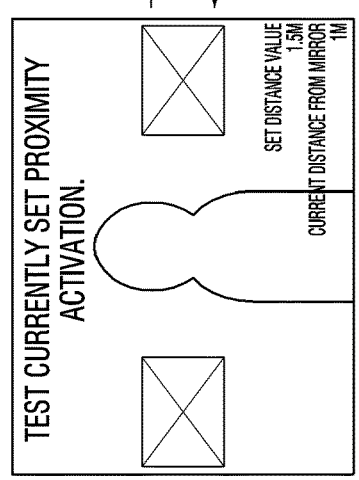
FIG. 25A
FIG. 25B
FIG. 25C

AIR GESTURE (SWIPE) →

AIR GESTURE (SWIPE) ↓

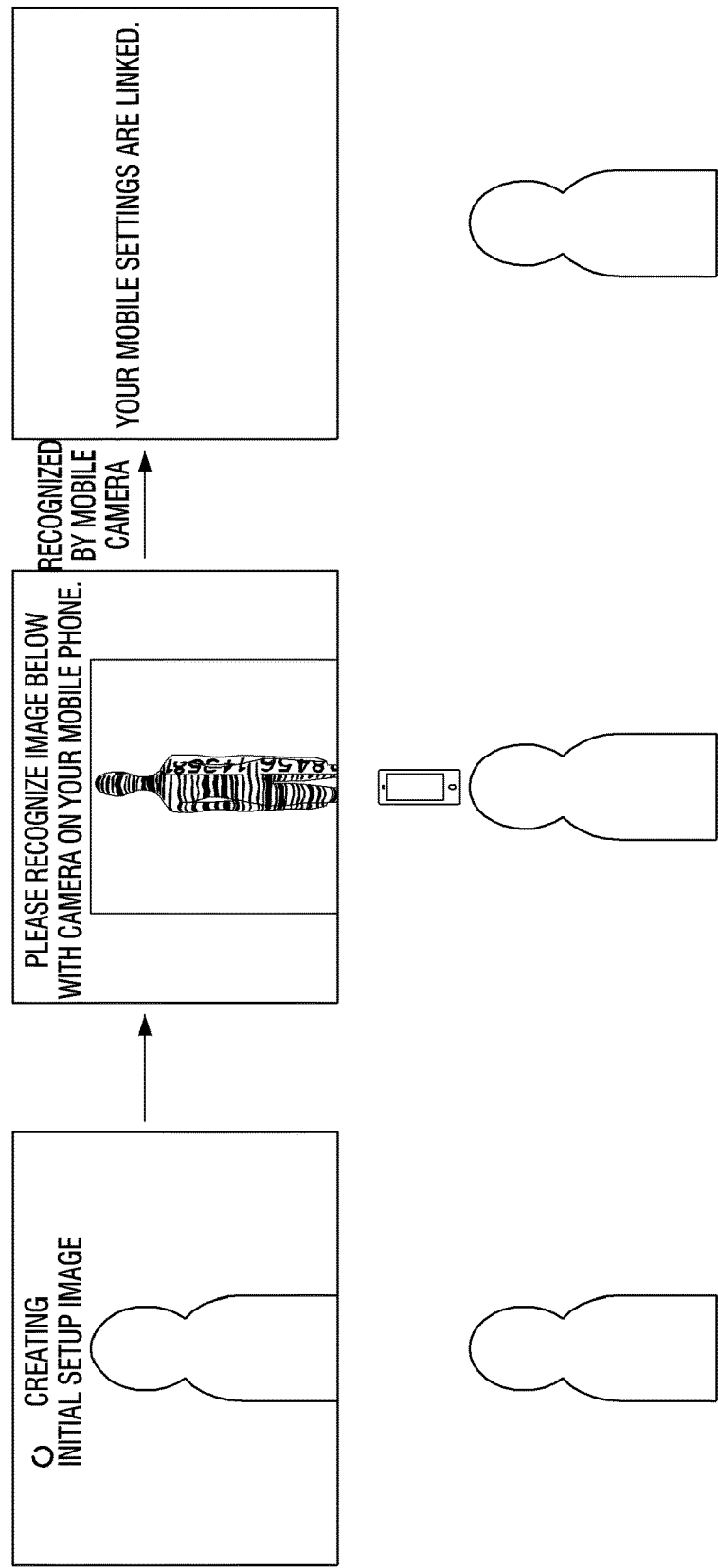

COME CLOSE →
← AWAY

VG READY

AIR GESTURE LEFT ↑

MUSIC

VOICE COMMAND ↑

"SET AN ALARM FOR 6:30 AM"

DISPLAY APPARATUS, DRIVING METHOD THEREOF, AND COMPUTER READABLE RECORDING MEDIUM

CROSS-REFERENCE TO RELATED APPLICATION

This application is based on and claims priority under 35 U.S.C. § 119 to Korean Patent Application No. 10-2016-0085012, filed in the Korean Intellectual Property Office on Jul. 5, 2016, the disclosure of which is incorporated by reference herein in its entirety.

BACKGROUND

1. Field

The present disclosure relates generally to a display apparatus, a driving method thereof, and computer readable recording medium, and for example, to a display apparatus, such as a DTV, which displays an image in a preset manner according to the interaction state of a user or a user device and simultaneously uses an area other than the image display area as a mirror, a driving method of the display apparatus, and a computer readable recording medium.

2. Description of Related Art

With the development of technology, a display apparatus has expanded its functions beyond the function of a display apparatus that simply provides image information to the function of an interior aspect.

In terms of the interior, conventional display apparatuses are made slimmer and simpler. As a result, the display apparatus has been expanded to functions as an interior part of a visual aspect.

Further, the display apparatus performs a mirror mode operation to make the apparatus into a mirror while the power is turned off, so that various functions can be performed from a visual aspect to a practical aspect.

However, in recent years, more and more element technologies further friendly to a user are required beyond a limited function of simply displaying an image on a display apparatus performing a mirror function.

SUMMARY

An example aspect of the present disclosure provides a display apparatus in which a display device such as a DTV displays an image in a preset manner according to the interaction situation with a user or a user device and at the same time uses an area other than the image display area as a mirror, a driving method of the display apparatus, and a computer-readable recording medium.

According to an aspect of an example embodiment, the driving method of the display apparatus includes displaying an image on an entire screen area of a display unit, and in response to a user or a user device (e.g., being detected within a predetermined proximity of) the display unit, controlling the display unit to reduce the image and to display the reduced image in a first area designated on the display unit and to control a second area other than the first area to operate as a mirror.

The method may further include, while the display apparatus is turned off, in response to the user or the user device approaching (e.g., being detected within a predetermined proximity of) the display apparatus, turning on the display apparatus and displaying information on the first area.

The method may further include, in response to the image being reduced, reducing a volume associated with the content.

The method may further include changing a position of the first area designated on the display unit based on a position of the user.

The method may further include, in response to the user not viewing an image in the first area, stopping reproduction of the image, and in response to the user viewing the image again, reproducing the stopped content.

The method may further include changing an operation state of the image displayed in the first area based on a position of the user.

The method may further include, in response to the user or the user device approaching (e.g., being detected within a predetermined proximity of) the display unit, controlling a voice recognizer comprising voice recognition circuitry to prepare for recognizing a voice of the user.

The first may have a size corresponding to a distance set by a user.

In response to the user looking at the first area for a predetermined time, the display apparatus may adjust a size of the first area.

In response to a finger operation (gesture) of a user, the first area may be changed to a state corresponding to each finger operation (gesture).

The method may further include, based on a recognition result of an object photographed by a photographing unit, displaying information associated with the object in a peripheral region of the first area.

The method may further include, in response to the user device approaching (e.g., being detected), displaying data stored in the user device on the screen, and displaying data selected by the user among the data displayed on the screen as a default regardless of whether the display apparatus is turned on or off.

The method may further include, in response to an interaction with the user or the user device other than the approaching operation, displaying a visual guide for searching content in a peripheral region of the first area.

The method may further include generating an image of the user reflected in the second area as a barcode, and in response to the user device storing the generated barcode approaching, authenticating the user device.

A display apparatus according to an example embodiment of the present disclosure includes a display unit configured to display an image in an entire area of a screen, and a processor configured to, in response to a user or a user device approaching (e.g., being detected), reduce the image and display the reduced image in a first area designated on the display unit, and to control the display unit to control a second area other than the first area to operate as a mirror.

The display panel includes a display panel configured to display the image, and a mirror panel disposed on the display panel and configured to perform a mirror function, and the processor may be configured to control the display apparatus such that the user may view the image in a third area of the mirror panel corresponding to the first area.

The display unit may further include a touch panel disposed on the mirror panel, and the touch panel may include a transparent state such that the mirror panel provides a mirror function.

The display apparatus may further include a user interface for recognizing the approaching (detected) user or user device, and the user interface may include at least one of a sensing unit including at least one sensor, a photographing unit comprising a camera, a voice acquisition unit comprising voice acquisition circuitry, and a signal transmission and reception unit including signal transmission and reception circuitry.

Another example aspect of the present disclosure includes a computer readable recording medium comprising a program which when executed causes a display apparatus to perform operations of a driving method of a display apparatus, the driving method of the display apparatus may preform operations comprising providing an image in an entire screen area of a display unit, and in response to a user or a user device approaching (e.g., being detected) the display unit, reducing the image and displaying the reduced image in a designated first area of the display unit, and operating a second area other than the first area as a mirror.

BRIEF DESCRIPTION OF THE DRAWINGS

The above and other aspects, features and attendant advantages of the present disclosure will be more readily appreciated and understood from the following detailed description, taken in conjunction with the accompanying drawings, in which like reference numerals refer to like elements, and wherein:

FIGS. 7A, 7B, 8A, 8B, 8C, 9A, 9b, 9C, 9D, 10A, 10B, 10C, 10D, 10E, 10F, 11A, 11B, 11C, 12A, 12B, 12C, 13A, 13B, 13C, 13D, 14A, 14B and 14C are diagrams illustrating an example operation of a display apparatus according to a user approach and position;

FIGS. 15A, 15B, 15C, 16A, 16B, 17A, 17B, 17C, 18A, 18B, 18C, 19A, 19B and 20 are diagrams illustrating an example driving process of a display apparatus based on a user's location and behavior;

FIGS. 21A, 21B, 21C, 22A, 22B, 22C, 23A and 23B are diagrams illustrating an example operation process by interaction with a user apparatus;

FIGS. 24A, 24B, 24C, 25A, 25B, 25C, 26A, 26B, 26C, 27A, 27B, 27C, 28A, 28B, 28C and 28D are diagrams illustrating an example of setting of an apparatus according to interaction with a user.

DETAILED DESCRIPTION

Various example embodiments are described in greater detail below with reference to the accompanying drawings.

Figure 1:
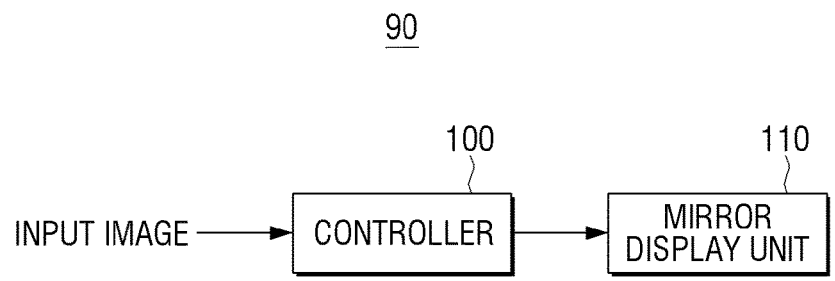
FIG. 1 is a block diagram illustrating an example structure of a display apparatus according to a first example embodiment of the present disclosure.

FIG. 1 is a block diagram illustrating an example structure of a display apparatus according to a first example embodiment of the present disclosure.

As illustrated in FIG. 1, a display apparatus 90 according to the first embodiment of the present disclosure includes some or all of a controller (e.g., including processing circuitry) 100 and a mirror display unit (e.g., including a display) 110.

The expression "include some or all of" may refer, for example, to the situation in which components such as the controller 100 may be integrated into the mirror display unit 110 by, for example, a Chip on Glass (COG) method. In the present disclosure, it will be described such that the display apparatus 90 includes all of the controller 100 and the mirror display unit 110.

First, the controller 100 displays an image received from an external source on the mirror display unit 110. Of course, since the controller 100 may include a memory therein, the controller 100 may display information or image data stored in the memory on the mirror display unit 110.

In an example embodiment of the present disclosure, since the mirror display unit 110 may display various information (e.g., weather, time information, etc.) and image data of an image under the control of the controller 100. Thus, the information or the image data can be called "data" without distinguishing them. Normally, an image signal representing a broadcast program is divided into a video signal, an audio signal, and additional information (e.g., subtitle, EPG information, etc.), wherein the video signal and the additional information may be data. Images such as photographs also correspond to data.

According to an embodiment of the present disclosure, the controller 100 may take various forms. For example, the controller 100 may include various processing circuitry, such as, for example, and without limitation, a dedicated processor, a microprocessor (CPU) (hereinafter referred to as a processor), or the like, and a memory as a one-chip form. Here, the processor may include a control circuit, a command interpretation unit, an arithmetic logic unit (ALU), a register, and the like, which will be apparent to those skilled in the art, and thus a description thereof will be omitted.

The controller 100 according to the first embodiment of the present disclosure may have only minimal hardware resources, software resources, for performing the operations of the present disclosure. For example, according to an embodiment of the present disclosure, the display apparatus 90 may utilize resources of a cloud server for insufficient hardware resources and software resources. For example, when the display apparatus 90 is required to perform a voice recognition operation, a voice recognition engine of a voice recognition apparatus connected to a communication network may be used. In this case, the voice recognition apparatus may be a kind of a cloud server.

According to an embodiment of the present disclosure, the controller 100 operates the mirror display unit 110 in a predetermined manner based on an interaction state with a user or a user apparatus. The operation of the controller 100 can be roughly classified into five categories.

The first situation is when a user approaches the display apparatus 90, or more precisely the mirror display portion 110, with the display apparatus 90 turned off. In this case, simple information may be displayed on the mirror display unit 110 only by the approach itself, and if the user is watching a content, the user can perform operations such as reducing the screen of the content being watched or reducing the volume. The term "approach" as used herein, may include, but is not limited to, detecting. For example, where the disclosure states that a user approaches, this may include detecting a user. This is technically possible. For example, when the mirror display unit 110 is divided and driven, the controller 100 only needs to activate a source driver that controls a specific area in which a content is displayed in a reduced size. In addition, since a resolution conversion for a content displayed on the current screen is performed through a scaler or the like when the mirror displayed unit is divided and driven, the image quality will not be greatly changed even if the content is reduced.

The second situation is to change the arrangement of content according to a location that the user approached. For example, if content is displayed in a remaining area (e.g., left and right area) other than the central part of the mirror display unit 110 approached by the user, or if there is content displayed on the current screen, the position is moved. This is to allow the user to conveniently use the mirror display unit 110 as a mirror.

The third situation is that when a hand is brought to the mirror display unit 110 before performing a specific interaction such as a user gesture or touching a pad, such situation is recognized and a visual guide is provided in an area, for example, an edge, of the screen. Here, the visual guide is a menu or a cue provided for changing channels, volumes, and the like. A cue represents a signal that directs the beginning of dialogue, movement, music, etc. to a program host or actor in a broadcast program. Therefore, the visual guide is a signal for notifying the start of a specific operation.

The fourth situation is that the user adjusts (e.g., tilts or shades) a screen state of content displayed on the mirror display unit 110 according to a position where the user views the content. This may be technically related to adjusting a viewing angle, and thus it may be sufficiently possible, technically, by changing the arrangement of a liquid crystal provided for each pixel in the mirror display unit 110. That is, by changing the arrangement of the liquid crystal, a light provided from a backlight is polarized and output as color light visible to the user. In addition, in the case of a 3D panel, depth information may be applied to form a perspective, so that it is possible to adjust the screen state.

The fifth situation is that the mirror display unit 110 displays data related to a mobile device such as a mobile phone as a user apparatus on the screen through interaction with the mobile device, and that the user may select the displayed data and add, for example, specific content to the mirror display unit 110.

The various situations described above will be described in greater detail below with reference to a UI screen, so further explanation will be omitted here.

In order to perform the above operation, the controller 100 may include various devices (e.g., a sensor, a camera, a local communication module, a microphone, etc.) for interacting with a user or a user apparatus. Alternatively, the devices may be formed as stand-alone individual devices and operated in conjunction with the controller 100. For example, if an individual device is a camera connected to the controller 100 (for example, by a jack), the controller 100 may analyze a photographed image of the camera and determine the position of the user, and control the mirror display unit 110 to perform the various operations described above based on the determined position.

When a plurality of sensors are positioned on or near the mirror display unit 110, if a user is sensed (e.g., detected) at the corresponding position, the controller 100 may control the mirror display unit 110 to perform the various operations described above.

In addition, in the state that a user apparatus is connected to a nearfield communication (e.g., WiFi, Bluetooth, etc.) module, when the user apparatus enters a designated communication field (e.g., is detected), the controller 100 may control the mirror display unit 110 to perform the various operations described above according to detection of the user apparatus. Here, a module is a set of circuits, and may include a chip and its peripheral circuits.

Meanwhile, the mirror display unit 110 performs both a image display function and a mirror function. Here, data display is more accurate than image display. The mirror display unit 110 may operate in a mirror mode or a transparent mode under the control of the controller 100 to perform the various operations mentioned above. The mirror mode is to cause the controller 100 to provide (or block) a voltage to the mirror display unit 110 to have a mirror function, and the transparent mode is an operation for the controller 100 to control the mirror display unit 110 to display data on the screen. Here, "mode" can be regarded as a method set by a designer such that a series of operations are sequentially performed based on a user command (e.g., button).

Even if the mirror display unit 110 does not supply a voltage to the mirror display unit 110, the mirror display unit 110 performs a mirror function at normal times. Then, under the control of the controller 100, it is also possible that the display unit 110 displays an image on the screen. This can significantly reduce power consumption compared to the above structure.

Further, the mirror display unit 110 according to the embodiment of the present disclosure may be formed by integrating a mirror panel performing a mirror function and a display panel displaying an image. Here, the integration means that a structure capable of performing both a mirror function and an image display function is formed between a top plate glass and a bottom plate glass rather than the two panels being joined or assembled to each other. For example, a touch panel may be coupled to a display panel from the outside, but may also be formed inside the display panel, and the above structure may be understood under this principle.

In addition, the mirror display unit 110 may include a gate driver (e.g., a chip type), a source driver, or the like mounted on a glass substrate by a COG method to display data (e.g., photographs, videos, weather information, etc.) on the screen. In addition, since it is possible to form a circuit directly on the substrate even if it is not in the form of a chip, the embodiment of the present disclosure is not particularly limited as to what form the mirror display portion 110 has.

According to the above configuration, the mirror display unit 110 may perform operations corresponding to the various conditions mentioned above under the control of the controller 100.

Figure 2:
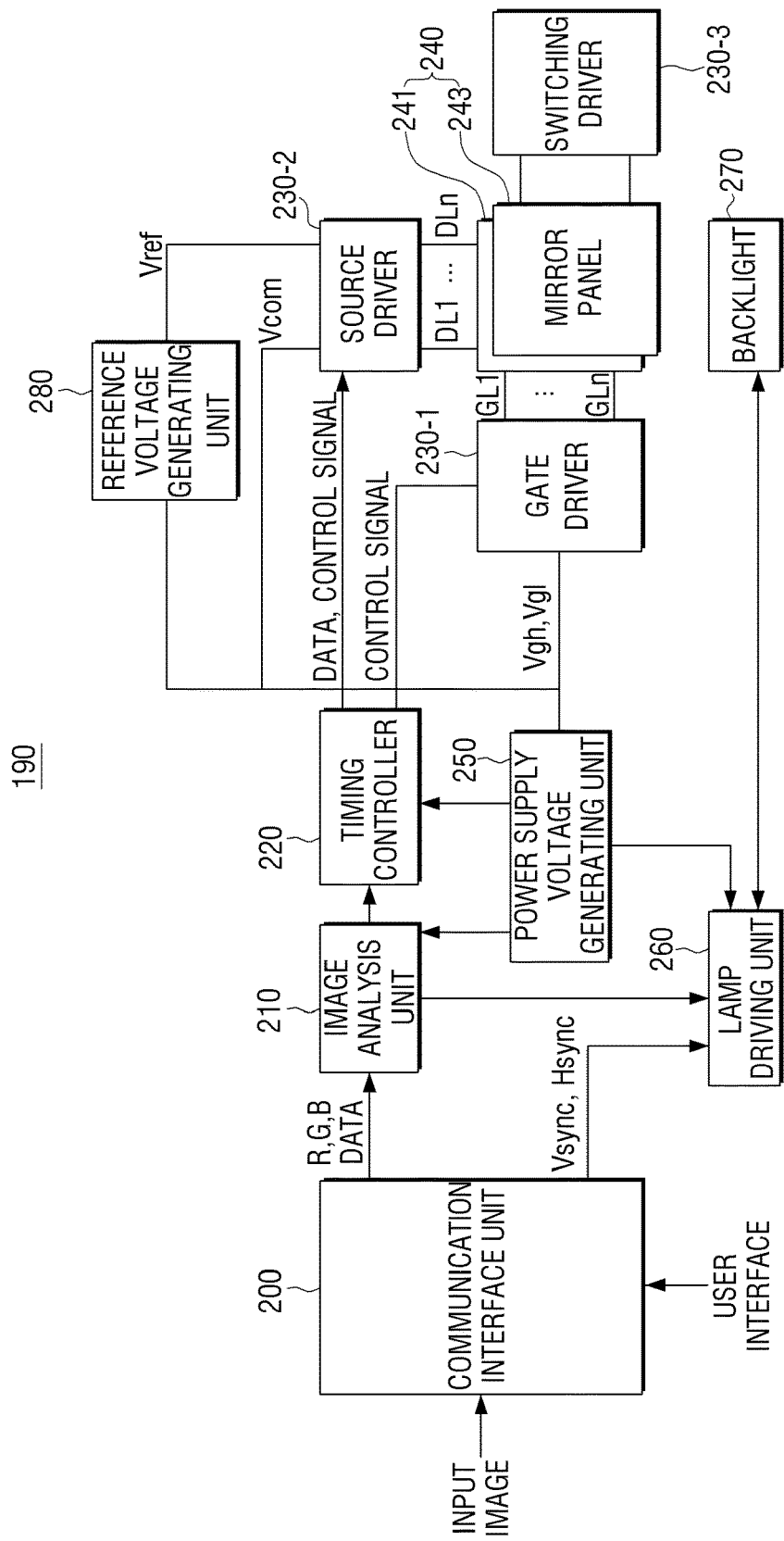
FIG. 2 is a block diagram illustrating an example structure of a display apparatus according to a second example embodiment of the present disclosure.
Figure 3:
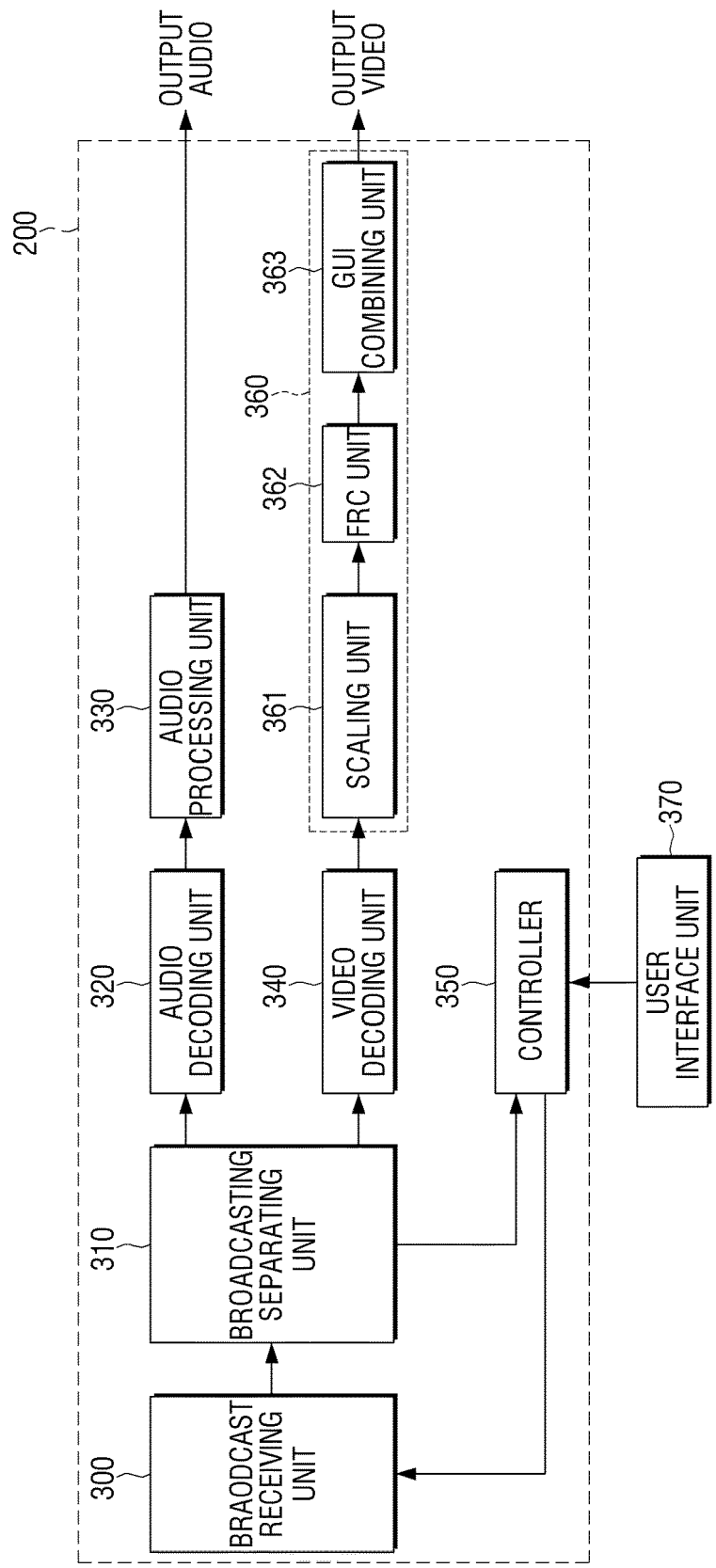
FIG. 3 is a block diagram illustrating an example structure of an example communication interface unit of FIG. 2.
Figure 4:
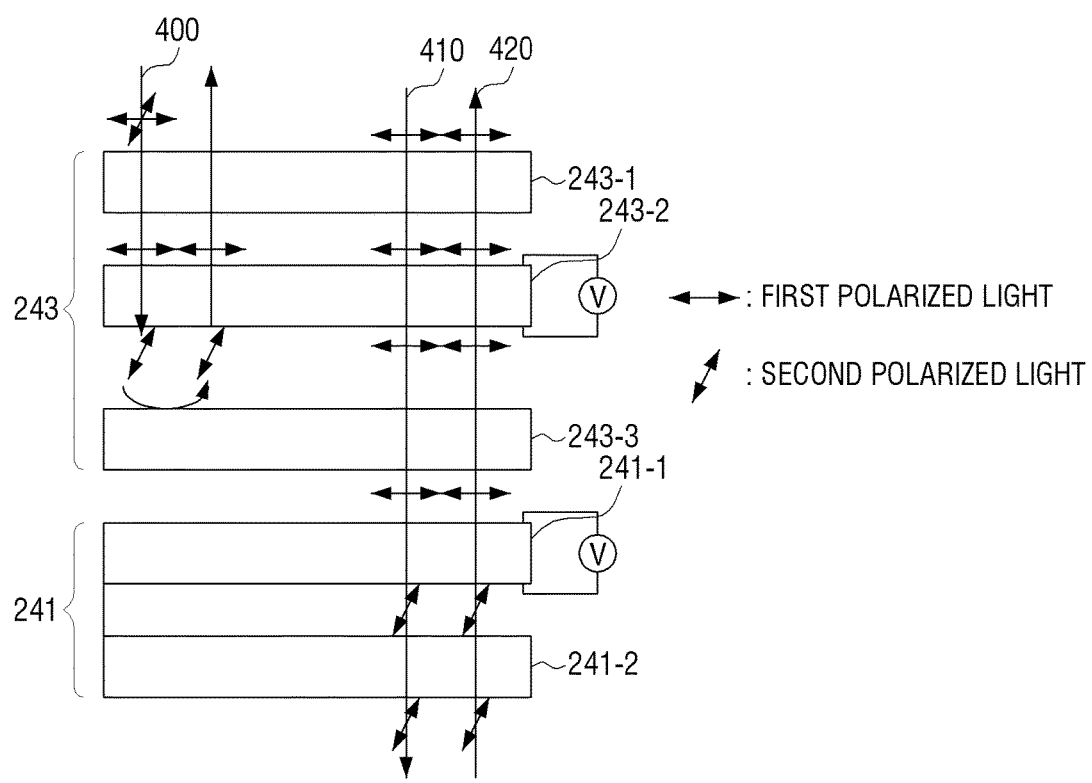
FIG. 4 is a diagram illustrating an example display unit of FIG. 2.

FIG. 2 is a block diagram illustrating an example structure of a display apparatus according to a second example embodiment of the present disclosure, FIG. 3 is a block diagram illustrating an example structure of the communication interface part of FIG. 2, and FIG. 4 is a diagram illustrating an example of a structure of the display unit of FIG. 2.

As illustrated in FIG. 2, the display apparatus 190 according to the second embodiment of the present disclosure includes some or all of a communication interface unit (e.g., including communication circuitry) 200, an image analysis unit (e.g., including image analysis circuitry) 210, a timing controller 220, a gate and source driver 230-1, 230-2, a switching driver 230-3, a display unit (or an image panel) 240, a power supply voltage generating unit 250, a lamp driving unit 260, a backlight 270 and a reference voltage generating unit 280.

Here, since the communication interface unit 200 and the image analysis unit 210 may be configured as separate apparatuses or can be omitted from the above apparatus 190, the embodiment of the present disclosure will not particularly limited to the above structure.

The communication interface unit 200 may include various communication circuitry, such as, for example, and without limitation, an image board such as a graphic card, and converts externally input image data to a resolution of the display apparatus 190 and outputs the converted image data. Here, the image data may be comprised of 8-bit image data of R, G, and B, and the communication interface unit 200 generates control signals such as a clock signal DCLK and vertical and horizontal synchronization signals Vsync and Hsync suitable for a resolution of the display apparatus 190. The communication interface unit 200 provides the image data to the image analysis unit 210 and provides vertical and horizontal synchronizing signals to the lamp driving unit 260 so that when the R, G, and B unit frame images are implemented on a display panel 241, the backlight 270 is operated in synchronization with the R, G, and B unit frame images.

More specifically, the communication interface unit 200 may have a structure as illustrated in FIG. 3. Here, a broadcast receiving unit (e.g., including receiver circuitry) 300 receives a broadcast signal from outside by tuning and performs an operation such as demodulation, and a broadcast separating unit 310 separates the received broadcast signal into a video signal, an audio signal, and additional information, and a video processing unit 340, 360 and an audio processing unit 320, 330 receive and process the signals separated by the broadcast separating unit 310. In addition, the controller 350 may store additional information (e.g., EPG information) separated by the broadcast separating unit 310 in an internal memory. When the user requests an electronic program guide (EPG), the video processing unit 340 and 360 combines the additional information with a video data input through a FRC unit 362 through a GUI combining unit 363 and output. The FRC unit 362 may adjust an operating frequency, for example, when there is a request for changing an operation frequency from the user for video reproduction. For example, if 30 frames per second is set to be displayed on the screen, it is adjusted so that 60 frames per second are displayed on the screen. Decoding units 320 and 340 may perform an operation of restoring compressed voice and video, the audio processing unit 330 may perform an operation such as removing noise from a voice signal, and a scaling unit 361 may perform an operation of adjusting a bit according to a resolution as described above.

According to the embodiment of the present disclosure, a user interface unit 370 includes at least one of a photographing unit such as a camera, a sound acquisition unit such as a microphone for acquiring user voice, a sensing unit such as a proximity sensor or an impact sensor, a signal transmission and reception unit for transmitting and receiving signals, and a physical button formed on the exterior of the display apparatus 190 such as a power button. In addition, the user interface unit 370 may further include a connector so as to be connected to the above-described apparatuses formed in the stand-alone form through the controller 350 and the connector. Through these various interfaces, the various operations mentioned above may be performed.

The image analysis unit 210 may be included in the communication interface unit 200. The image analysis unit 210 receives image data from the communication interface unit 200 as illustrated in FIG. 2 and generates a unit frame image of R, G, and B and provide the generated unit frame image to the timing controller 220, analyzes the image data, and controls the lamp driving unit 260 according to the analysis result so that the backlight 270 is adaptively driven. For example, if a unit frame image in which the R, G, and B are mixed is provided in the communication interface unit 200, the image analysis unit 210 may generate the unit frame image in which the R, G, and B are mixed as three unit frames including a unit frame of R, a unit frame of G, and a unit frame of B for driving Color Filter less (CFL) and provide the three unit frames to the timing controller 220.

In the embodiment of the present disclosure, it is preferable that the image analysis unit 210 analyzes an image to generate coordinate values, and the corresponding coordinate values are provided to the switching driver 230-3.

The timing controller 220 provides video data comprised of R, G, and B unit frames provided from the video analysis unit 210 to the source driver 230-2, and controls the video data output from the source driver 230-2 using a control signal so that the R, G, and B unit frames can be sequentially implemented in the display panel 241. The timing controller 220 controls the gate driver 230-1 so that the gate on/off voltage provided by the power supply voltage generating unit 250 can be provided to the display panel 241 on a horizontal line basis. For example, when a gate voltage is applied to a gate line 1 (GL1), the timing controller 220 controls the source driver 230-2 to apply video data corresponding to a first horizontal line. Then, a gate line 2 (GL2) is turned on and the first gate line is turned off so that video data corresponding to a second horizontal line is applied from the source driver 230-2 to the display panel 241. In this manner, a unit frame image of R, G, or B is displayed on the entire screen of the display panel 241.

Meanwhile, the timing controller 220 may provide position information (e.g., coordinate information) about video data to the switching driver 230-1. Of course, such a process may be provided to the timing controller 220 through the image analysis unit 210, and therefore, there is no particular limitation on where the operation is performed. If it is performed in the image analysis unit 210, the timing controller 220 performs only the function of transmitting the corresponding position information to the switching driver 230-3.

The gate driver 230-1 receives a gate on/off voltage (Vgh/Vgl) provided from the power supply voltage generating unit 250 and applies the corresponding voltage to the display panel 241 under the control of the timing controller 220. The gate-on voltage (Vgh) is sequentially supplied to the display panel 241 from the gate line GL1 to the gate line GLn when a unit frame is implemented.

The source driver 230-2 converts video data provided in a serial manner in the timing controller 220 into parallel data and converts digital data into an analog voltage to provide video data corresponding to one horizontal line to the display panel 241 simultaneously and sequentially. The source driver 230-2 may receive a common voltage (Vcom) generated by the power supply voltage generating unit 250 and a reference voltage (Vref) (or gamma voltage) provided from the reference voltage generating unit 280. Here, the common voltage Vcom is provided as a common electrode of the display panel 241, and the reference voltage Vref is provided to a D/A converter in the source driver 230-2 to express gradation of a color image. In other words, video data provided by the timing controller 220 may be provided to the D/A converter, wherein digital information of the video data provided to the D/A converter is converted into an analog voltage capable of expressing gradation of a color and provided to the display panel (241).

The switching driver 230-3 may control the mirror panel 243 based on position information of data provided by the timing controller 220. Since the mirror panel 243 may also have a sub-pixel unit area corresponding to each of R, G, and B sub-pixels of the display panel 241, the switching driver 230-3 may have to control the corresponding area of the mirror panel 243 to allow light of the display panel 241 to be transmitted so that the user can view the data. However, since the display panel 241 displays a color by forming one dot of R, G and B, it may be preferable that the mirror panel 243 controls an area corresponding to a pixel unit of the display panel 241.

The display panel 241 may include a first substrate, a second substrate, and a liquid crystal layer disposed therebetween. At this time, a plurality of gate lines (GL1 to GLn) and data lines (DL1 to DLn) for defining a pixel region by intersecting with each other and a pixel electrode is formed in the intersecting pixel region. In addition, a Thin Film Transistor (TFT) is formed at one corner of the pixel region, more precisely at a corner. During a turn-on operation of the TFT, a liquid crystal is twisted by a difference between a voltage applied to a pixel electrode of the first substrate and a voltage applied to a common electrode of the second substrate, and the R, G, and B lights of the backlight 270 are sequentially transmitted.

The mirror panel 243 is combined with the display panel 241 to configure the display unit 240. Since the mirror panel 243 may have a liquid crystal layer like the display panel 241 and the liquid crystal layer is controlled by a voltage provided at both ends to transmit a color light of the display panel 241, it will not be significantly different from the structure of the display panel 241.

For example, the display unit 240 according to the embodiment of the present disclosure may have the structure as illustrated in FIG. 4. The mirror panel 243 is positioned at the upper end of the display unit 240 and the display panel 241 is disposed at the lower end of the mirror panel 243. Accordingly, the front surface of the mirror panel 243 may be disposed to face a viewing direction of the user. The mirror panel 243 includes a (first) absorption type polarization unit 243-1, a polarization switch unit 243-2, and a reflection type polarization unit 243-3. On the other hand, the display panel 241 may include a liquid crystal panel 241-1 and a (second) absorption type polarization unit 241-2.

The absorption type polarization unit 243-1 transmits a first polarized light in one axis direction among an incident light from the outside and absorbs a second polarized light in the other axis direction. Here, the first polarized light is polarized light having a vibration surface parallel to a polarization axis of the absorption type polarization unit 243-1, and the second polarized light has a vibration surface parallel to a direction intersecting the polarization axis of the absorption type polarization unit 243-1.

The absorption type polarization unit 243-1 may be formed of a protective film of a laminated form such as a surface treatment film (not shown), a TAC (not shown), an absorption type polarizing film (PVA) (not shown) and a phase difference correction film. Since such an absorption type polarization unit 243-1 is well known to those skilled in the art, further explanation is omitted.

The polarization switch unit 243-2 may change the polarization direction of the first polarized light transmitted through the absorption type polarization unit 243-1 according to whether power is supplied or not. According to one embodiment, when the power supply is interrupted, the polarization switch unit 243-2 may change the first polarized light to the polarization direction of the second polarized light, and maintain the polarization direction of the first polarized light when power is supplied. According to another embodiment, when the power supply is interrupted, the polarization switch unit 243-2 may change the polarization direction of the first polarized light to 90 degrees or 270 degrees, and maintain the polarization direction of the first polarized light when the power supply is interrupted.

When the first polarized light is transmitted through the polarization switch unit 243-2, the reflection type polarization unit 243-3 may provide the transmitted first polarized light to the display panel 241, and when the changed polarized light is provided, reflect the changed polarized light. Here, the changed polarized light may be the second polarized light or the polarized light changed to 90 degrees or 270 degrees. That is, when the second polarized light or the polarized light changed to 90° or 270° is provided, the reflection type polarization unit 243-3 may reflect the provided polarized light and provide the changed polarized light in the direction in which the polarization switch unit 243-2 is disposed. Here, the reflection type polarization unit 243-3 may be formed by stacking a protective film such as an Over Coat (or an overcoat layer), a phase difference compensation film, a reflection type polarizing film, or a phase difference compensation film.

On the other hand, when the polarized light reflected from the reflection type polarization unit 243-3 is provided, the polarization switch unit 243-2 with the power supply cut off may change the reflected polarization to the first polarization and output the first polarized light to the absorption type polarization unit 243-1. Therefore, the absorption type polarization unit 243-1 may provide the first polarized light provided from the polarization switch unit 243-2 as it is, so that the mirror panel 243 has a mirror function. That is, the mirror panel 243 may be regarded as operating in a mirror mode.

As shown in the figure, when the external light 400 is incident from the outside in a state where the power supply to the polarization switch unit 243-2 is cut off, the absorption type polarization unit 243-1 may transmit only the first polarized light in one axis direction among the incident external light, and the polarization switch unit 243-2 may convert the transmitted first polarized light into the second polarized light. Accordingly, the reflection type polarization unit 243-3 may reflect the second polarization provided from the polarization switch unit 243-2. When the second polarized light reflected by the reflection type polarization unit 243-3 is provided to the polarization switch unit 243-2, the polarization switch section 243-2 converts the provided second polarized light into the first polarized light, and the absorption type polarization unit 243-1 may provide the first polarized light converted from the polarization switch unit 243-2 as it is, so that the mirror panel 243 can operate in the mirror mode. Accordingly, the display apparatus 190 has a mirror function in the mirror panel 243 operating in the mirror mode.

On the other hand, when the external light 410 is incident from the outside in a state that the power is supplied to the polarization switch unit 243-2, the absorption type polarization unit 243-1 may change the polarization direction of the first polarized light, and the polarization switch unit 243-2 may maintain the transmitted first polarized light as it is. Thus, the reflection type polarization unit 243-3 may provide the display panel 241 with the first polarized light provided from the polarization switch unit 243-2, so that the mirror panel 243 can operate in the transparent mode. As the mirror panel 243 operates in the transparent mode, the display apparatus 190 enables a user to view an image output to the display panel 241 through a mirror panel 243 operating in a transparent mode when the image is displayed on the display panel 241.

On the other hand, the display panel 241 may include a liquid crystal panel 241-1 and an absorption type polarization unit 241-2. The liquid crystal panel 241-1 may be an LED panel, but the description thereof will be omitted for the sake of explanation. The liquid crystal panel 241-1 is disposed at the lower end of the mirror panel 243 and is disposed on the lower surface of the reflection type polarization unit 243-3 and displays an image through pixels formed in a region where a plurality of scan lines and data lines cross when power is supplied. The absorption type polarization unit 241-2 may be disposed between the liquid crystal panel 241-1 and the backlight 270 and provide the light irradiated through the backlight 270 to the liquid crystal panel 241-1. Accordingly, the liquid crystal panel 241-1 to which the power is supplied may convert the light transmitted through the absorption type polarization unit 241-2 to the first polarized light, and transmit the first polarized light to the reflection type polarization unit 243-3 of the mirror panel 243, which operates in the transparent mode.

That is, when the light 420 irradiated through the backlight 270 passes through the absorption type polarization unit 241-2, the absorption type polarization unit 241-2 may transmit the transmitted light to the liquid crystal panel 241-1 to which power is supplied. Accordingly, the liquid crystal panel 241-1 may convert the light transmitted through the absorption type polarization unit 241-2 to the first polarized light, and transmit the first polarized light to the reflection type polarization unit 243-3 of the mirror panel 243, which operates in the transparent mode. The reflection type polarization unit 241-3 may provide the first polarized light transmitted through the liquid crystal panel 241-1 to the polarization switch unit 243-2 and the polarization switch unit 243-2 may transmit the first polarized light to the absorption type polarization unit 243-1. Accordingly, the display apparatus 190 may display the image output from the display panel 241 through the mirror panel 243 operating in the transparent mode.

The power supply voltage generating unit 250 may generate a DC voltage of various sizes by receiving a prevailing voltage from the outside, that is, an AC voltage of 110V or 220V. A voltage of various sizes may be generated and provided. For example, for the gate driver 230_1, for example, a DC 15V voltage can be generated and provided as a gate-on voltage (Vgh), a voltage of DC 24V may be generated and provided for the lamp driver 260, and for the timing controller 220, a voltage of DC 12V may be generated and provided. Further, the power supply voltage generating unit 250 may generate and provide a driving voltage of the image analysis unit 210.

The lamp driving unit 260 may convert the voltage supplied from the power supply voltage generating unit 250 and provide the converted voltage to the backlight 270. The lamp driving unit 260 may operate in conjunction with the image analysis unit 210 to sequentially the R, G, and B LEDs constituting the backlight 270 on a color-by-color basis, or drive only the LEDs having a color corresponding to a specific position. In addition, the lamp driving unit 260 may include a feedback circuit for feedback-controlling the driving current of the LED so that uniform light can be provided from the RGB LED of the backlight 270. In addition, the lamp driving unit 260 may adaptively control the backlight 270 according to the analysis result provided by the image analysis unit 210. Such details are already known to those skilled in the art, so further explanation is omitted.

Figure 5:
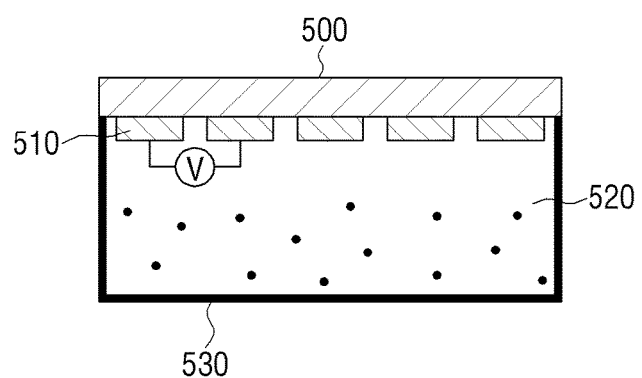
FIG. 5 is a diagram illustrating an example structure of an example polarization switch unit illustrated in FIG. 4.

FIG. 5 is a diagram illustrating an example structure of the polarization switch unit illustrated in FIG. 4.

As illustrated in FIG. 5, the polarization switch 243-2 of FIG. 4 according to the example embodiment of the present disclosure may include a glass unit 500 in or on which a transparent electrode 510 is formed, a liquid crystal material 520, and a sealing member 530.

Here, the glass unit 500 and the sealing member 530 may be bonded to each other and apply the liquid crystal material 520 therein.

Meanwhile, the glass unit 500 may be formed on one side adjacent to the absorption type polarization unit 243-1, and a plurality of transparent electrodes 510 may be arranged in a pattern at regular intervals on the inner surface of the one side of the glass unit 500. Here, the pattern refers to a a pattern formed by depositing a material corresponding to a pattern in the process of a production line on a substrate and then etching the pattern. As shown in the figure, a plurality of transparent electrodes 510 disposed on the inner surface of the glass unit 500 may be paired with each other and may receive power from the outside. In other words, the liquid crystal is twisted by the potential difference of the voltage applied to both electrodes.

When power is applied through the plurality of pairs of transparent electrodes 510, the polarization switch unit 243-2 may emit a first polarized light emitted from the absorption type polarization unit 243-1 in accordance with the twist of the liquid crystal, or emit the first polarized light emitted from the reflection type polarization unit 243-1 to the absorption type polarization unit 243-1.

On the other hand, when power is not supplied through the plurality of pairs of transparent electrodes 510, the polarization switch unit 243-2 may convert a first polarized light emitted from the absorption type polarization unit 243-1 into a second polarized light and provide it to the reflection type polarization unit 243-3, and may convert the second polarized light emitted from the reflection type polarization unit 243-2 to the first polarized light and provide it to the absorption type polarization unit 243-1.

On the other hand, in the embodiment of the present disclosure, the surface on which the plurality of transparent electrodes 510 are disposed is composed of the glass unit 500 and the other surface is composed of the sealing member 530. However, the present disclosure is not limited to this embodiment, and the surface on which the plurality of transparent electrodes 510 are disposed and the other surface corresponding to the surface may be also made of the glass unit 510, and the both surfaces may be also made of the sealing member 530.

As a result of the above configuration, the polarization switch unit 243-2 may change the polarization direction by using the first polarized light emitted through the absorption type polarization unit 243-1 as the second polarized light depending on whether power is supplied or not.

Figure 6:
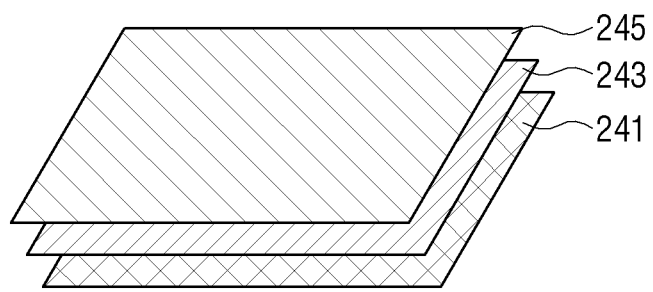
FIG. 6 is a diagram illustrating an example modification of an example display unit illustrated in FIG. 2.

FIG. 6 is a diagram illustrating another example of the display unit illustrated in FIG. 2.

As illustrated in FIG. 6, the display apparatus 190 according to the second example embodiment of the present disclosure may include a display unit 240' having the structure illustrated in FIG. 6.

The display unit 240' of FIG. 6 may include some or all of the display panel 241, the mirror panel 243, and the touch panel 245, and including some or all of something is the same as the meaning described above.

According to the example embodiment of the present disclosure, it is preferable that the touch panel 245 is formed entirely transparently using a transparent electrode or the like. This is because the mirror panel 243 can function as a mirror. However, the example is not limited thereto.

A user interface operation may be performed via the touch panel 245 in accordance with an example embodiment of the present disclosure. The touch panel 245 may be of various types such as a capacitive touch panel or a resistive touch panel. However, if a coordinate value is set and a user touches a portion corresponding to the coordinate, the display apparatus 190 may be able to recognize an image corresponding to the portion receiving the touch input. In other words, since the display apparatus 190 of FIG. 2 will designate a coordinate value at which position an icon (or menu) is displayed when displaying an image on the screen, when the coordinate value is received, the display apparatus 190 will recognize which icon the user has touched based on the received coordinate value and perform the set operation.

In this manner, the display apparatus 190 may recognize a finger operation (e.g., pinch-to-zoom) from a user to enlarge or reduce the display area of the content displayed in a certain area of the screen, and perform an operation according to a predetermined function or method.

Hereinafter, the various situations mentioned above will be discussed in terms of the user experience (UX) and the user interface (UI). If necessary, the preceding drawings will be referred to in more detail.

FIGS. 7A, 7B, 8, 9, 10, 11, 12, 13 and 14 are diagrams illustrating example operation of a display apparatus according to a user access and position.

Figure 7A:
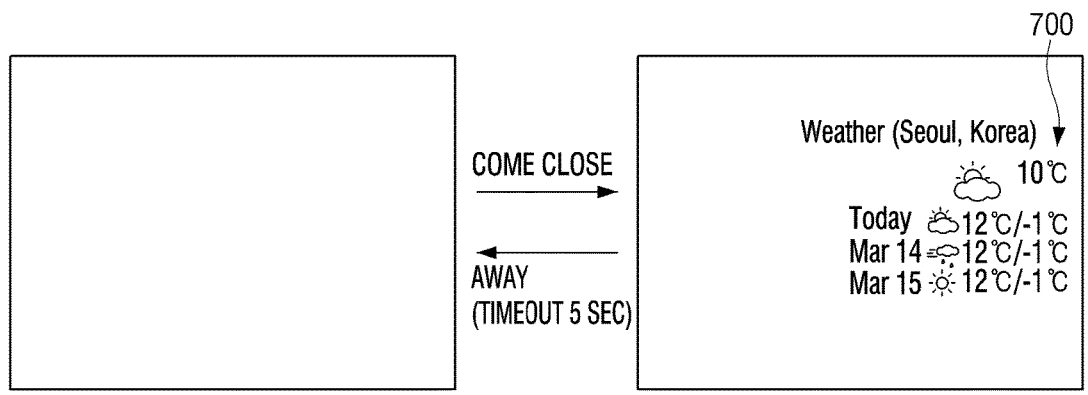

Referring to FIGS. 7A and 14 along with FIG. 2 for convenience of explanation, FIG. 7A illustrates that when the user approaches the display apparatus 190 in the mirror mode, simple information 700 such as weather or news can be provided. Here, the mirror mode state may refer, for example, to a state in which the power of the display apparatus 190 is turned off, or a state in which the display apparatus 190 operates in a power saving mode to display a data on a screen after having a mirror function.

If the camera is mounted on the display apparatus 190, the display apparatus 190 may easily identify whether the user has approached the display apparatus 190. However, if an impact sensor or a proximity sensor is provided, the display apparatus 190 may identify whether the user has approached when a sensing signal is received from the corresponding sensor.

Figure 7B:
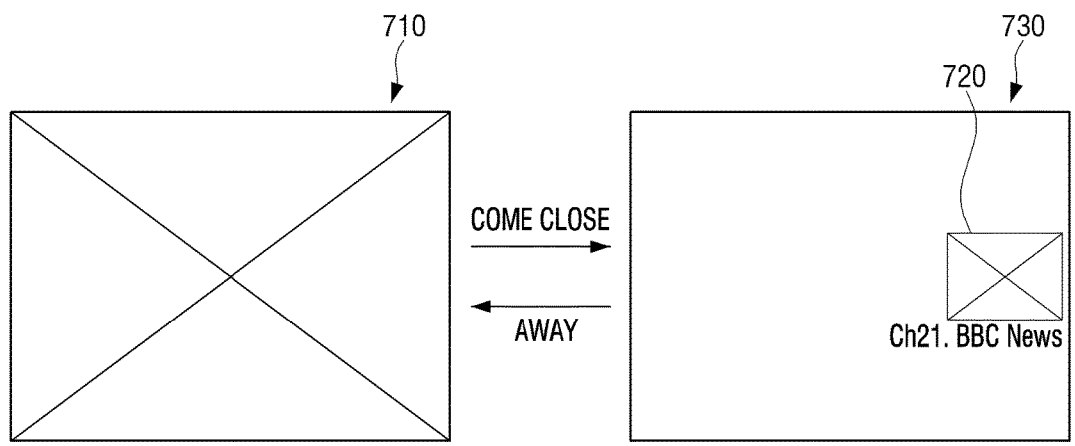

FIG. 7B illustrates an image on the reduced screen 720 by reducing the size of the screen that was being watched when the user approaches while watching the TV using mode (at a remote location) on the full screen 710. At this time, in order to naturally reduce the size of the screen, it is possible to sequentially reduce the size according to the distance of the user. Of course, the remaining areas 730 in which the image is displayed act as a mirror.

The display apparatus 190 may measure the distance of the user from the image captured by the camera, for example, and display the image on the screen in a size matched to the measured distance. Thus, it will be worked easily. For example, if an image is set to be displayed at a distance of 15×15 (unit: cm) at a distance of 2 m and the image is set to be displayed at a size of 10 m at a distance of 1 m, the image may be reduced and displayed on the screen accordingly. In the course of this, the display apparatus 190 may further perform an operation for converting the resolution. All of these operations are determined by the system designer in designing the display apparatus 190, and the display apparatus 190 may simply be operated according to the determined manner.

FIGS. 8A, 8B and 8C are diagrams illustrating an example change in the size of the content and the size of the sound according to the user's location.

As illustrated in FIGS. 8A, 8B and 8C, the display apparatus 190 of FIG. 2 may reduce the size of the image displayed on the current screen as the distance from the user decreases, and at the same time, the volume output to a speaker is reduced. At this time, the display apparatus 190 is adjusted so that the user can hear the same sound volume as that the user has heard from afar.

In other words, when the user approaches and is positioned at a predetermined distance, if the size of the image is set to be reduced, the size of the display apparatus 190 is reduced. If the size of the display apparatus 190 is set so as to reduce the volume, the operation is performed accordingly.

Through these processes, users will be able to feel more intimacy with the display apparatus 190.

FIGS. 9A, 9B, 9C and 9D are diagrams illustrating an example category interlocking process. For example, a function being used in the TV mode is automatically added to the category of the UI.

As illustrated in FIG. 9A, when the user moves his/her hand near the display apparatus 190 (ex. on the side) while viewing the content (e.g., content provided by Netflix), the display apparatus 190 may reduce the size of the screen on which the content is currently displayed according to a preset method, and also display information 900 related to the content currently displayed in the lower area as illustrated in FIG. 9B.

In addition, when the user moves the hand up or down in a state close to the user, the content displayed on the current screen may be changed accordingly (see FIG. 9C).

When the user taps the content displayed on the screen, a category 190 related to the content may be generated and displayed on the screen as illustrated in FIG. 9D. For example, a default category may be provided at the time of initial release of TV, the category related to the corresponding content may be added to the default category, and the number of such additional categories may be limited, for example, by user settings. Of course, the number of additional categories may be limited in various ways in addition to the above.

FIGS. 10A, 10B, 10C, 10D, 10E and 10F are diagrams illustrating an example content navigation process according to the first example embodiment using a touch and a proximity sensor.

As illustrated in FIG. 10, the display apparatus 190 of FIG. 2 according to the example embodiment of the present disclosure may display contents in one area 1000 of the screen as illustrated in FIG. 10A. Of course, the remaining area 1010 may perform a mirror function.

In this case, for example, when the touch pad is provided on the right edge of the display apparatus 190, for example, the bezel, when the swipe operation (e.g., swipe up or swipe down) is performed while touching, the other contents that are changed accordingly are displayed in the area 1000 designated as illustrated in FIG. 10B.

As illustrated in FIG. 10B, a cue 1020 (ex. play, stop, search, etc.) or a menu for controlling the state of the current contents is displayed on the adjacent screen when the pad is simply touched. If there is no user instruction or touch in a predetermined time (e.g., 1 second), the display apparatus 190 may cause the displayed cue 1020 to disappear from the screen.

Then, the display apparatus 190 may continuously reproduce the content at the current stage as illustrated in FIG. 10C.

On the other hand, if the corresponding content is tapped in the process as illustrated in FIG. 10A, the screen may be switched to the category screen as illustrated in FIG. 10D.

As illustrated in FIG. 10A, the user may perform a swipe up or down operation to select a category to be reproduced. When the user desires to execute the selected category, the user may select the corresponding item to reproduce the music contents as illustrated in FIG. 10E in the designated area as illustrated in FIG. 10F.

Figure 11A:
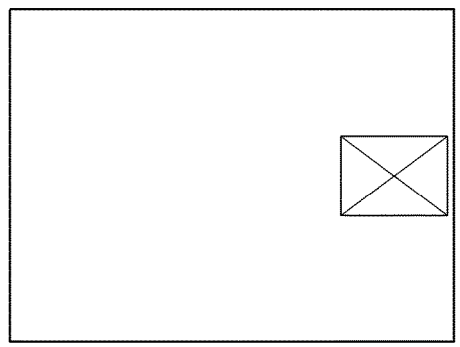
Figure 11B:
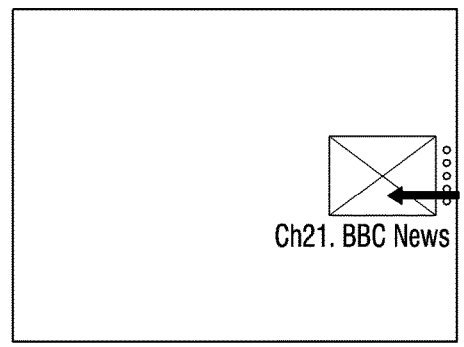
Figure 11C:
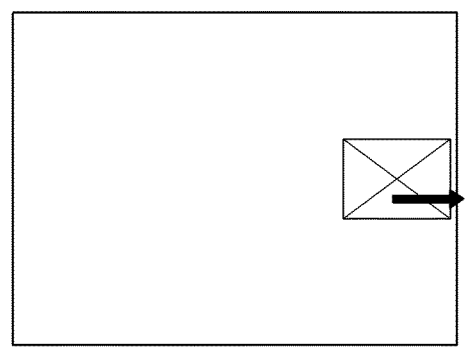

FIGS. 11A, 11B and 11C are diagrams illustrating an example content navigation process according to a second example embodiment using a touch and a proximity sensor.

As illustrated in FIG. 11A, the display apparatus 190 of FIG. 2 has a proximity sensor on the side thereof so that a user can perform a hover operation, that is, touch with a finger, to provide a cue or a visual guide in the vicinity of content currently being reproduced in order to recognize a situation in advance before the user performs a specific interaction. Of course, the visual guide may be displayed and controlled by the recognition of the gesture or the use of the touch pad.

For example, as illustrated in FIGS. 11B and 11C, the content may be pushed to the left or right when the user approaches the touch pad, thereby displaying the current content information and the visual guide.

Other operations (e.g. visual guide disappears) are not so different from those in FIG. 10, and the detailed description will be omitted.

Figure 12A:
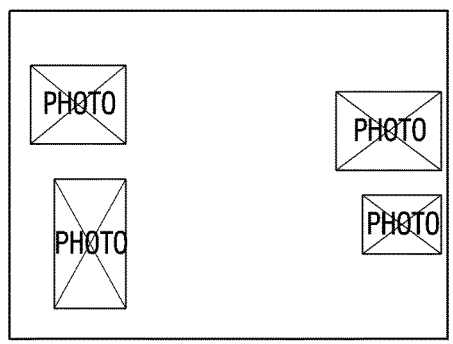
Figure 12B:
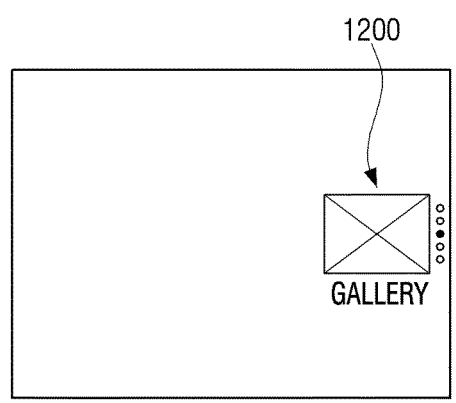
Figure 12C:
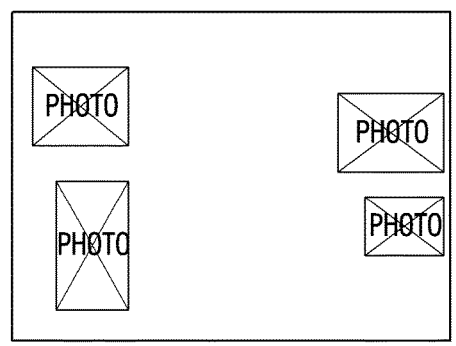

FIGS. 12A, 12B and 12C are diagrams illustrating an example content navigation process according to a third example embodiment using a touch and a proximity sensor.

As illustrated in FIGS. 12A-12C, the display apparatus 190 of FIG. 2 is in the process of executing a proximity mood in which, for example, the user apparatus is brought close to display the pictures stored in the user apparatus on the screen as illustrated in FIG. 12A.

When the user accesses and performs the hover operation in this state, it is possible that the pictures displayed on the screen are moved to the designated area 1200 as illustrated in FIG. 12B and become smaller, and the information of the current contents and the visual guide may be provided. Thereafter, if there is no special operation from the user, it may return to the original state as illustrated in FIG. 12C.

FIGS. 13A, 13B, 13C and 13D are diagrams illustrating an example content navigation process according to a fourth example embodiment using a touch and a proximity sensor.

Figure 13A:
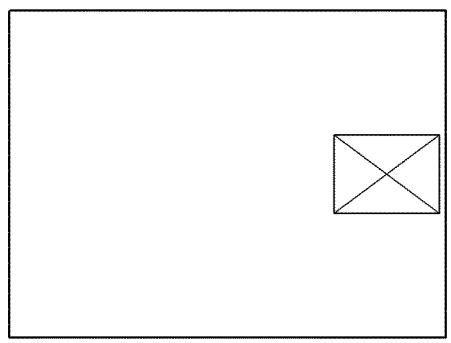
Figure 13B:
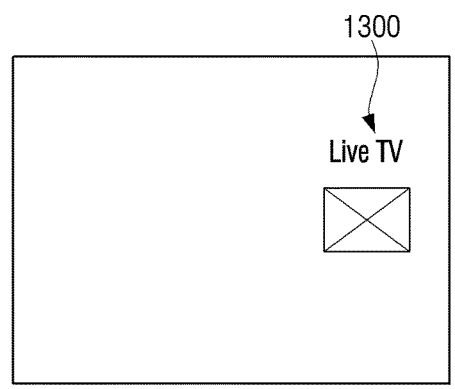

As illustrated in FIGS. 13A-13D, the size of the content displayed on the screen may be reduced by the hover operation of the user, and the name 1300 of the current category may appear (see FIG. 13B).

Figure 13D:
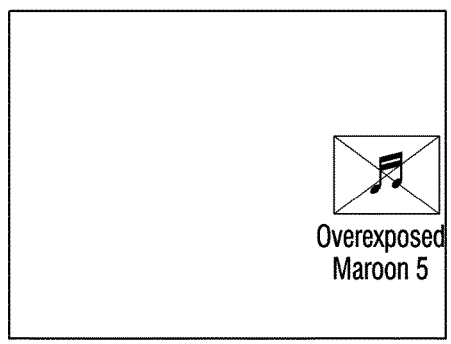
Figure 13C:
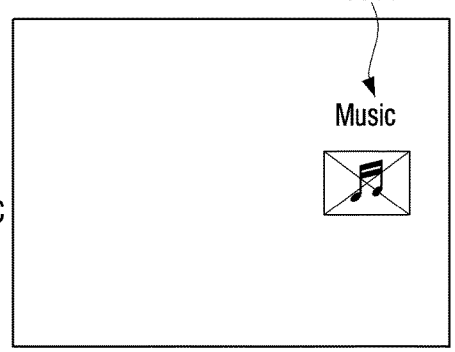

If the air gesture of the user is maintained, the display apparatus 190 of FIG. 2 may display content thumbnails of other categories in the corresponding region 1310 (see FIG. 13C).

Thereafter, if there is no instruction from the user within a predetermined time, the reduced thumbnail will be enlarged again and the content will be reproduced (see FIG. 13D).

FIGS. 14A, 14B and 14C are diagrams illustrating an example of recognizing a user position and changing content arrangement.

As illustrated in FIGS. 14A-14C, while the mood function is being executed, the display apparatus 190 of FIG. 2 may move the contents to a space other than the user's appearance when the user approaches. This may be the result of the display apparatus 190 determining that the user desires to use the display apparatus 190 as a mirror. Here, the mood function refers to a function of displaying a certain picture on a screen of the display apparatus 190 having a mirror function normally as illustrated in FIG. 14A.

Such a change of position may be changed dynamically according to the change of the position of the user as illustrated in FIGS. 14B and 14C. For example, when the user is positioned in the center area of the screen, the content moves to the left and right sides.

FIGS. 15A, 15B, 15C, 16A, 16B, 17A, 17B, 17C, 18A, 18B, 18C, 19A, 19B, 19C, 20A and 20B are diagrams illustrating an example driving process of a display apparatus based on a user's location and behavior.

Referring to FIGS. 15A, 15B, 15C, 16A, 16B, 17A, 17B, 17C, 18A, 18B, 18C, 19A, 19B, 19C, 20A and 20B along with FIG. 2 for convenience of explanation, FIGS. 15A-15C are diagrams illustrating an operating process according to whether a content is viewed or not. When the user does not view the content using the display apparatus 190, the content may be stopped, and when the user views the content again, the content may be reproduced.

This technique may technically track the user's head or eyes through the camera to determine where the user looks, and if it is determined that the user is looking at the content according to the determination result, the user may play the corresponding content.

For example, when the user looks at a mirror area corresponding to the remaining area while watching the content as illustrated in FIGS. 15A and 15C, the display apparatus 190 may stop the content viewed by the user as illustrated in FIG. 15B. For example, if the content such as following a makeup is being reproduced, this operation may be very useful to the user.

FIGS. 16A and 16B are diagrams illustrating an example operation of forming a PIP tilt or shadow region according to the position of the user.

As illustrated in the sections of FIG. 16A, the display apparatus 190 of FIG. 2 displays the content screen in a tilted position at a position where the user moves and views the content, which may be viewed as changing the state of the screen.

For example, the display apparatus 190 may enable this operation by changing the arrangement of the liquid crystals in the liquid crystal layer corresponding to the region in which the content image is displayed. Alternatively, a depth may be formed like a 3D image to feel the distance, so that the above operation can be performed.

In addition, as illustrated in FIG. 16B, a tilted effect can be felt by generating a shadow around the currently reproduced content area.

Figure 17B:
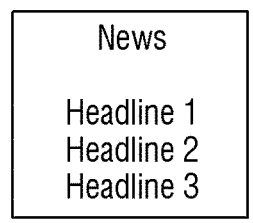
Figure 17C:
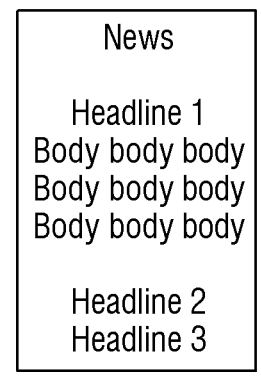

FIGS. 17A-17C are diagrams illustrating example expansion of information of a content to be viewed.

As illustrated in FIGS. 17A and 17C, when the user views the content displayed on the screen of the display apparatus 190 of FIG. 2, a reproduction area of the content becomes larger as illustrated in the far right section of FIG. 17A.

As mentioned above, when the display apparatus 190 perceives the intention that the user is looking at the contents for a certain period of time with the tracking of the head and eye through the camera, it provides the expanded contents.

FIGS. 17B and 17C illustrate enlarging detailed information and displaying the enlarged detailed information. Since they are not so different from FIG. 17A, the detailed description will be replaced with the above contents.

FIGS. 18A, 18B and 18C are diagrams illustrating an example UI display process according to a user's position.

As illustrated in FIGS. 18A-18C, the display apparatus 190 reacts to the position and behavior of the user and changes the position where the information is displayed. For example, as illustrated in FIG. 18A, a message may be displayed near the face through the user's position recognition. In the middle area, information is displayed on the left side. When the user moves to the left side, as illustrated in FIG. 18B, the information is displayed on the right side based on the user reflected on the mirror again.

In addition, when the user wears a specific device such as a watch on his/her body, information related to a specific body part may be displayed near the corresponding part as illustrated in FIG. 18C. FIG. 18C illustrates that information is displayed in the peripheral region of the chest region.

Figure 19A:
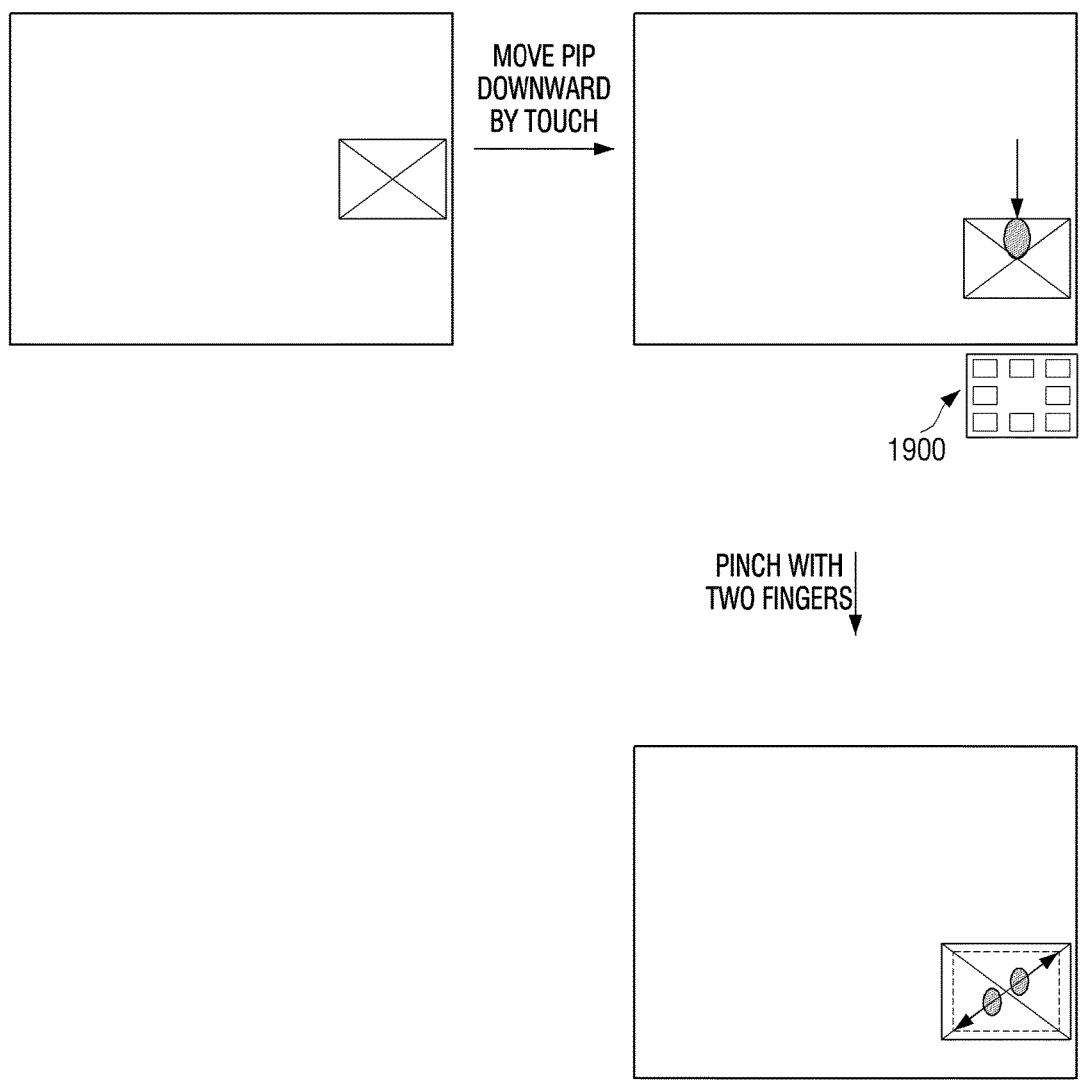

FIGS. 19A and 19B are diagrams illustrating an example process of moving, enlarging, and reducing a content reproduction screen to a position desired by a user.

As illustrated in FIG. 19A, while the content is being reproduced in the area designated on the screen, when the user touches the right side (e.g., the touch pad) of the display apparatus 190 and moves downward, the playback screen snaps down together.

At this time, as illustrated in the lower end portion of FIG. 19A, if the eight basic positions 1900 are designated on the display apparatus 190 and move near the designated position, the corresponding playback screen may be moved to the nearest area.

Also, in FIG. 19A, the user can perform a pinch-in or pinch-out operation so that the image can be enlarged and reduced. For example, if the screen is a touch screen, the display apparatus 190 may recognize the pinch-in or pinch-out operation of the user and adjust the size of the reproduction screen through the recognition.

As illustrated in FIG. 19B, if an input with force is received in the right touch pad of the reproduction screen, it is possible to enter the position setting screen. If the position of the position setting screen is changed by swipe and selected by tapping the screen, the reproduction screen may be moved to the lower right end.

Such an operation eventually recognizes the user's operation or situation (by a camera, a sensor, etc.), and the display apparatus 190 operates in a system preset in the system according to the recognition result. Therefore, it can be easily worked by those skilled in the art based on the above.

FIG. 20 is a diagram illustrating a control process using a projector.

The display apparatus 190 of FIG. 2 may include a projector 2000 and a camera on the right side (of a panel) as illustrated in FIG. 20.

Accordingly, for example, the projector 2000 may provide various information when the user brings his/her hand to the right side of the reproduction screen. For example, let's assume a keyboard solution. A keyboard screen may be projected on the wall. At this time, if the user selects a specific key from the keyboard of the projected shadow, the camera may capture it, and the display apparatus 190 may analyze the captured image and control the operation according to the analysis result. In this way, the display apparatus 190 may perform various operations such as display and selection of the browsing UI by using the projector 2000.

In addition, by using the above projector 2000, it is possible to provide various menus that the user can use in a mirror area other than the reproduction screen area.

FIGS. 21A, 21B, 21C, 22A, 22B, 22C, 23A and 23B are diagrams illustrating an example operation process by interaction with a user apparatus.

Figure 21A:
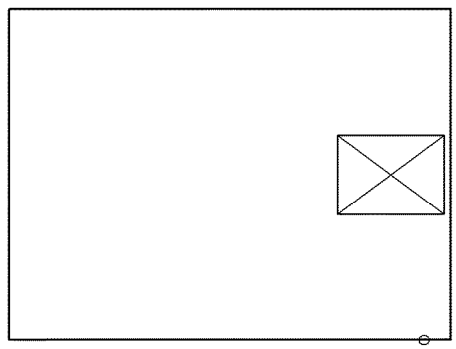

When the user brings a user apparatus 2100, for example, a mobile device, to a specific area of the display apparatus 190 as illustrated in FIG. 21A (e.g., perform NFC communication), contents that may be brought from the user apparatus 210 may be displayed on the screen of the display apparatus 190. For example, a service, a contact, and the like that can be linked to the mobile device may be provided. Prior to such operation, a pairing operation to register device information may be performed between the two apparatuses.

Figure 21B:
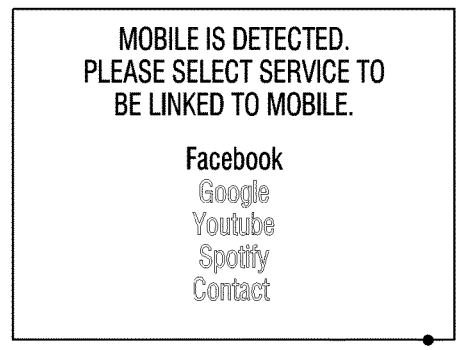
Figure 21C:
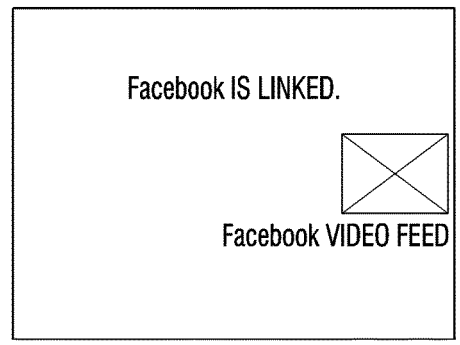

When the user taps a specific item in FIG. 21B, the content is linked to the selected item (including account information) and displayed on the reproduction screen (see FIG. 21C).

As illustrated in FIGS. 22A-22C, when the mobile device enters a certain communication radius (e.g., Wi-Fi) in a state where the display apparatus 190 is off, music contents are reproduced and displayed in a designated area as illustrated in FIG. 22A. Of course, such an operation may be limited to a mobile device already registered. When the user taps the reproduction screen, the user may display the contents of the mobile device in close proximity, and display the content corresponding to the item on the designated screen when the user selects the specific item as illustrated in FIG. 22B. If the user selects a contact on the screen of FIG. 22B, the call connection will be possible immediately as illustrated in FIG. 22C.

FIGS. 23A and 23B illustrate example executable functions according to the recognized object (or type of object). When the user illuminates a specific object such as a toothbrush or a clock in front of the camera provided in the display apparatus 190 as illustrated in FIG. 23A, the display apparatus 190 may display information about the object in the designated area. For example, if the toothbrush is illuminated, the time for gargling (ex. 3-minute counter) may be automatically executed as illustrated in FIG. 23B. Health information may be displayed by illuminating a clock. For example, the display apparatus 190 may connect weight scales and show weight changes.

FIGS. 24A, 24B, 24C, 25A, 25B, 25C, 26A, 26B, 26C, 27A, 27B, 27C and 28A, 28B, 28C and 28D are diagrams illustrating an example of setting of an apparatus in accordance with the interaction with the user.

Referring to FIGS. 24A, 24B, 24C, 25A, 25B, 25C, 26A, 26B, 26C, 27A, 27B, 27C and 28A, 28B, 28C and 28D along with FIG. 2 for convenience of explanation, as illustrated in FIGS. 24A-24C, the display apparatus 190 may allow the user to select whether a content, thumbnail, or contents screen can be seen well such as a game and set the selected content, thumbnail or contents screen as a preferred screen (e.g. Form of vision test, stand at your preferred distance, can you see well?, what about this size?).

As illustrated in FIG. 24A, when the user is close to the display apparatus 190, the content may be displayed in a area designated on the screen, and the UI window may be displayed together asking whether the user can see the current image well.

In addition, as illustrated in FIG. 24B, the size of the reproduction screen may be adjusted through a gesture.

In this state, if the user selects the corresponding reproduction screen as illustrated in FIG. 24C, the selected reproduction screen size may be stored. This may be displayed on the screen of the display apparatus 190 in various sizes since it may be set for each user.

When such a process is associated with a voice recognition operation, for example, a speech recognizer for recognizing a trigger command such as "Hi TV" may not be necessary for the display apparatus 190. In other words, since the display apparatus 190 may start the voice recognition operation only by the approach to the distance.

FIGS. 25A-25C illustrate an example distance measurement process for setting up a close-up interaction, and illustrates a process of changing a basic proximity interaction value using a gesture in accordance with the usage style or environment of the user.

As illustrated in FIG. 25A, the display apparatus 190 of FIG. 2 may test and reset the basic proximity interaction operation based on the distance to the current user.

As illustrated in FIGS. 25B and 25C, the distance may be set through the gesture, and the distance mode may be converted into the near mode and the remote mode according to the set distance value. When the setting by the gesture is completed, the display apparatus 190 of FIG. 2 may set the proximity interaction to the measured distance value as illustrated in of FIG. 25C.

Figure 26A:
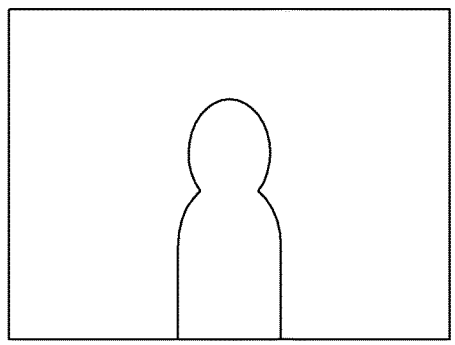
Figure 26B:
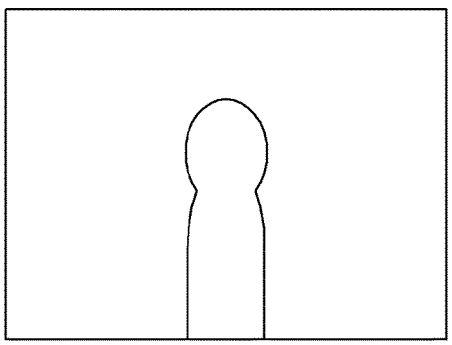
Figure 26C:
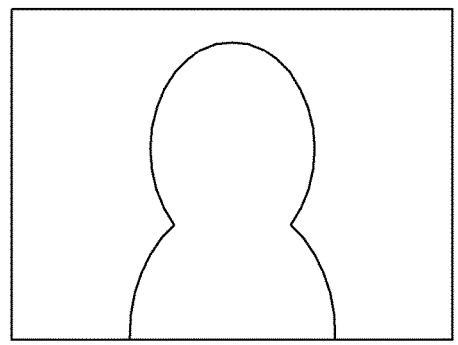

FIGS. 26A-26C are diagrams illustrating example setting and switching of the mirror mode with a simple gesture, and FIG. 26A illustrates a basic mirror function. The user may simply switch to Filter or Mirror mode with a swipe gesture. Here, the mirror mode may include switching to a thin mirror, a 3× zoom mirror or the like as illustrated in FIGS. 26B and 26C, and may further include a mode such as switching to a monochrome mirror.

FIGS. 27A-27C are diagrams illustrating an example of initial setting process using the camera of the mobile device. In the initial setting, an image associated with the user is generated as a code by using the camera of the display apparatus 190, and the generated image is recognized as a camera of the mobile device, thereby linking the mirror and the mobile device.

As illustrated in FIG. 27A, when the user approaches the display apparatus 190, the camera recognizes the user. As illustrated in FIG. 27B, an image associated with the user is generated as a code based on the recognized user and displayed on the screen, and the user uses the mobile device to photograph the image and complete the recognition operation.

Then, the display apparatus 190 may recognize the code stored in the mobile device and perform an operation with the mobile device as illustrated in FIG. 27C.

The above process may be used for security, authentication, etc., and may be friendly because it generates only the user's code.

Figure 28A:
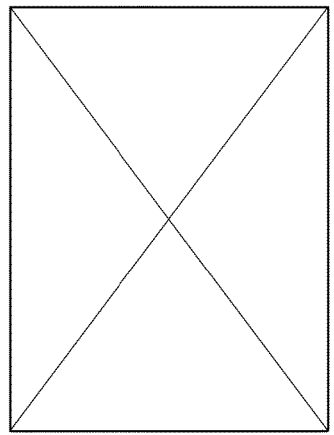

FIGS. 28A-28D are diagrams illustrating example preparations for a gesture or voice recognition through close-up interaction. When the user approaches the display apparatus 190, the apparatus may automatically enter a ready state for gesture or voice recognition and provide a guide (visual guide) as illustrated in FIG. 28A.

Figure 28B:
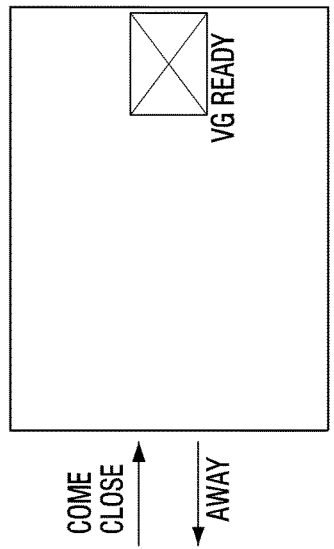

In other words, when the user enters the display apparatus 190, the voice recognizer may be activated for voice recognition, and a proximity sensor or the like for recognizing the gesture may be activated as illustrated in FIG. 28B. Here, activation may mean that a voltage may be applied to the device.

Figure 28C:
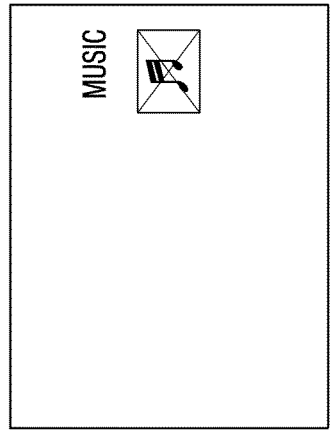
Figure 28D:
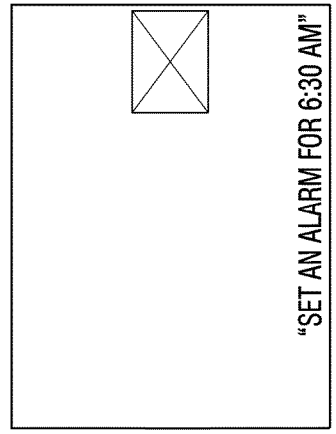

Next, the music can be reproduced as illustrated in FIG. 28C according to the gesture of the user, and the information is displayed on the screen by performing an operation according to the voice command word as illustrated in FIG. 28D.

Figure 29:
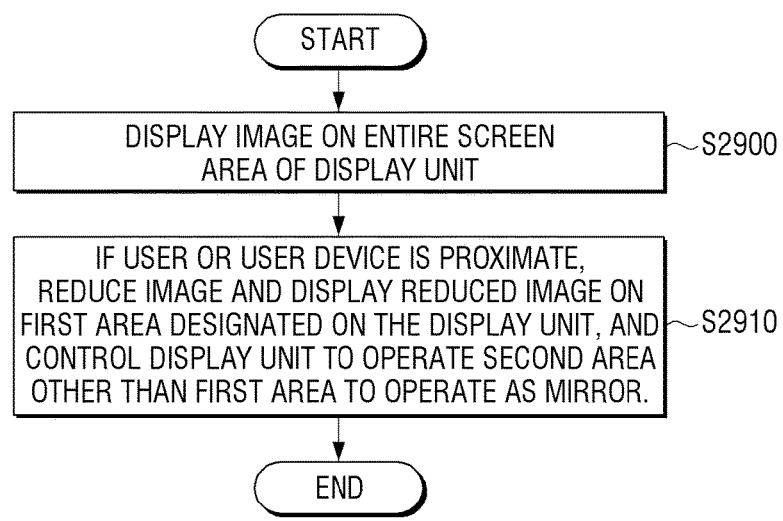
FIG. 29 is a flowchart illustrating an example driving process of a display apparatus according to an example embodiment of the present disclosure.

FIG. 29 is a flowchart illustrating an example driving process of a display apparatus according to an example embodiment of the present disclosure.

Referring to FIG. 29 along with FIG. 2 for convenience of explanation, the display apparatus 190 according to the example embodiment of the present disclosure may display an image on the entire screen area of the display unit, at operation S2900.

If the user or the user device is proximate (e.g., detected), the image is reduced and displayed on the first area designated on the display unit, and the second area other than the first area is controlled to operate as a mirror, at operation S2910.

On the other hand, the description of the present disclosure is not necessarily limited to these embodiments, though all the constituent elements comprising the various example embodiments of the present disclosure are described as being combined or operated in one operation. That is, within the scope of the present disclosure, all of the elements may be selectively coupled to one or more of them. In addition, although all of the components may be implemented as one independent hardware, some or all of the components may be selectively combined to be implemented as a computer program having a program module that performs some or all of the functions combined in one or a plurality of hardware. The codes and code segments that make up the computer program may be easily deduced by those skilled in the art of the present disclosure. Such a computer program may be stored in a non-transitory computer readable media and read and executed by a computer to implement embodiments of the present disclosure.

The non-transitory computer readable medium may refer, for example, to a medium that stores data, and is readable by an apparatus. Specifically, the above-described programs may be stored in non-transitory computer readable recording media such as CD, DVD, hard disk, Blu-ray disk, USB, memory card, ROM, and the like.

The foregoing example embodiments and advantages are merely examples and are not to be construed as limiting the present disclosure. The present teaching can be readily applied to other types of apparatuses. Also, the description of the example embodiments of the present disclosure is intended to be illustrative, and not to limit the scope of the claims, and many alternatives, modifications, and variations will be apparent to those skilled in the art.

What is claimed is:

1. A method of driving a display apparatus, the method comprising:
    displaying an image on an entire screen area of a display unit comprising a display; and
    based on a user being detected within a predetermined distance from the display apparatus while the image is displayed on the entire screen area, controlling the display unit to reduce a size of the displayed image without changing an aspect ratio of the displayed image and display the size-reduced image in a first area of the screen area and to operate a second area of the screen area other than the first area as a mirror.

2. The method as claimed in claim 1, further comprising:
    based on the user being detected within a predetermined distance from the display apparatus while the display apparatus is turned off, turning on the display apparatus and displaying information on the first area.

3. The method as claimed in claim 1, further comprising:
in response to the image being reduced, reducing a volume associated with the content.

4. The method as claimed in claim 1, further comprising:
changing a position of the first area designated on the display unit based on a position of the user.

5. The method as claimed in claim 1, further comprising:
in response to the user not viewing an image in the first area, pausing reproduction of the image; and
in response to the user viewing the image again, restarting reproducing the image.

6. The method as claimed in claim 1, further comprising:
changing an operation state of the image displayed in the first area based on a position of the user.

7. The method as claimed in claim 1, further comprising:
to based on the user being detected within the predetermined distance from the display apparatus, controlling a voice recognizer comprising voice recognition circuitry to prepare for recognizing a voice of the user.

8. The method as claimed in claim 1, wherein the first area has a size corresponding to a distance set by a user.

9. The method as claimed in claim 1, wherein in response to the user looking at the first area for a predetermined time, adjusting a size of the first area.

10. The method as claimed in claim 1, wherein in response to a gesture of a user, the first area is changed to a state based on the gesture.

11. The method as claimed in claim 1, further comprising:
based on a recognition result of an object photographed by a photographing unit comprising a camera, displaying information associated with the object in a peripheral region of the first area.

12. The method as claimed in claim 1, further comprising:
based on the user being detected within the predetermined distance from the display apparatus, displaying data stored in a user device on the screen; and
displaying data selected by the user among the data displayed on the screen as a default regardless of whether the display apparatus is turned on or off.

13. The method as claimed in claim 1, further comprising:
in response to an interaction with the user other than the detecting operation, displaying a visual guide for searching content in a peripheral region of the first area.

14. The method as claimed in claim 1, further comprising:
generating an image of the user reflected in the second area as a barcode; and
in response to a user device storing the generated barcode being detected, authenticating the user device.

15. A display apparatus, comprising:
a display unit comprising a display, and configured to display an image in an entire screen area of a screen of the display; and
a processor configured to, based on a user being detected within a predetermined distance from the display apparatus while the image is displayed on the entire screen area, reduce a size of the displayed image without changing an aspect ratio of the display image and cause to be displayed the size-reduced image in a first area of the screen, and to control the display unit to operate a second area of the screen other than the first area as a mirror.

16. The apparatus as claimed in claim 15, wherein the display unit further comprises:
a display panel configured to display the image; and
a mirror panel disposed on the display panel and configured to perform a mirror function, and
wherein the processor is further configured to control the display unit so that the user may view the image in a third area of the mirror panel corresponding to the first area.

17. The apparatus as claimed in claim 16, wherein the display unit further comprises a touch panel disposed on the mirror panel, and
wherein the touch panel includes a transparent state such that the mirror panel provides a mirror function.

18. The apparatus as claimed in claim 15, further comprising:
a user interface configured to recognize the detected user,
wherein the user interface includes at least one of a sensing unit comprising at least one sensor, a photographing unit comprising a camera, a voice acquisition unit comprising voice acquisition circuitry, and a signal transmission and reception unit comprising signal transmitting and receiving circuitry.

19. A non-transitory computer readable recording medium having recorded thereon a program which when executed by a processor, causes a display unit comprising a display to perform operations comprising:
providing an image on an entire screen area of the display unit; and
based on a user being detected within a predetermined distance from a display apparatus including the display unit while the image is displayed on the entire screen area, reducing a size of the displayed image without changing an aspect ratio of the displayed image and displaying the size-reduced image in a first area of the screen area, and operating a second area of the screen area other than the first area as a mirror.

* * * * *